United States Patent
Sekiguchi et al.

(10) Patent No.: US 11,820,391 B2
(45) Date of Patent: Nov. 21, 2023

(54) VEHICLE PROGRAM UPDATE SYSTEM AND VEHICLE PROGRAM UPDATE METHOD

(71) Applicant: TOYOTA JIDOSHA KABUSHIKI KAISHA, Toyota (JP)

(72) Inventors: Yoshito Sekiguchi, Kariya (JP); Atsushi Tabata, Okazaki (JP); Koichi Okuda, Toyota (JP); Masafumi Yamamoto, Nagakute (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 367 days.

(21) Appl. No.: 17/154,301

(22) Filed: Jan. 21, 2021

(65) Prior Publication Data
US 2021/0309237 A1 Oct. 7, 2021

(30) Foreign Application Priority Data

Apr. 3, 2020 (JP) .................... 2020-067915

(51) Int. Cl.
*B60W 50/029* (2012.01)
*B60W 50/035* (2012.01)
(Continued)

(52) U.S. Cl.
CPC ........ *B60W 50/029* (2013.01); *B60W 50/035* (2013.01); *G06F 8/65* (2013.01); *B60W 2050/0292* (2013.01)

(58) Field of Classification Search
CPC ............. B60W 50/029; B60W 50/035; B60W 2050/0292; B60W 2556/45; B60W 50/0098; G06F 8/65; G06F 11/1433
See application file for complete search history.

(56) References Cited

U.S. PATENT DOCUMENTS

2003/0188303 A1* 10/2003 Barman .................... G06F 8/65
717/173
2017/0291593 A1 10/2017 Iwagami et al.
(Continued)

FOREIGN PATENT DOCUMENTS

JP 2009-042850 A 2/2009
JP 2009042850 A * 2/2009
(Continued)

OTHER PUBLICATIONS

Translation of JP-2009042850-A, Ota Takatoshi, Control Device for Vehicle, and Device for Updating Vehicle Control Program, Feb. 26, 2009, Honda Motor Co Ltd (from the IDS submitted on Jan. 21, 2021).*

*Primary Examiner* — Geepy Pe
*Assistant Examiner* — Kimia Kohankhaki
(74) *Attorney, Agent, or Firm* — Oliff PLC

(57) ABSTRACT

A vehicle program update system and a vehicle program update method are provided which update a vehicle program that is used to control a vehicle by an on-board control device mounted on the vehicle to an update program received by the vehicle from an external device separate from the vehicle via wireless communication. When the update of the vehicle program is completed, determination is made whether the updated vehicle program is normal. When determination is made that the updated vehicle program is not normal, control of the vehicle is switched from control that is performed by the on-board control device using the vehicle program to limp home control for performing a limp home operation in which the vehicle travels using a driving force from a vehicle driving force source without being controlled by the on-board control device.

7 Claims, 6 Drawing Sheets

(51) Int. Cl.
    *B60W 50/02*     (2012.01)
    *B60W 50/08*     (2020.01)
    *G06F 8/65*     (2018.01)

(56) References Cited

U.S. PATENT DOCUMENTS

2018/0341571 A1* 11/2018 Kislovskiy ................ G06F 8/65
2019/0356552 A1* 11/2019 Ricci ................ B60W 50/0098

FOREIGN PATENT DOCUMENTS

| JP | 2017-185930 A | 10/2017 |
| JP | 2017-202738 A | 11/2017 |

* cited by examiner

| AT GEAR STAGE | C1 | C2 | B1 | B2 | F1 |
|---|---|---|---|---|---|
| 1st | ○ | | | △ | ○ |
| 2nd | ○ | | ○ | | |
| 3rd | ○ | ○ | | | |
| 4th | | ○ | ○ | | |
| Rev | ○ | | | ○ | |

# VEHICLE PROGRAM UPDATE SYSTEM AND VEHICLE PROGRAM UPDATE METHOD

CROSS-REFERENCE TO RELATED APPLICATION

This application claims priority to Japanese Patent Application No. 2020-067915 filed on Apr. 3, 2020, incorporated herein by reference in its entirety.

BACKGROUND

1. Technical Field

The disclosure relates to vehicle program update systems and vehicle program update methods for updating a vehicle program.

2. Description of Related Art

Vehicle program update systems for updating a vehicle program that is used to control a vehicle by an on-board control device mounted on the vehicle to an update program received by the vehicle from an external device separate from the vehicle via wireless communication are well known in the art. An example of such a vehicle program update system is a vehicle control program update device described in Japanese Unexamined Patent Application Publication No. 2009-42850 (JP 2009-42850 A). JP 2009-42850 A discloses that, when a vehicle control program for normal control of a vehicle is updated successfully, the vehicle control program is executed, and when the vehicle control program is not updated successfully, a failsafe control program for failsafe control of the vehicle is executed so that the driver can safely move the vehicle.

SUMMARY

The on-board control device includes, e.g., a central processing unit (CPU), a memory, etc. and performs various controls of the vehicle using programs stored in the memory. In the technique described in JP 2009-42850 A, the vehicle control program is stored in a rewritable area of a nonvolatile memory, and the failsafe control program is stored in a non-rewritable area of the nonvolatile memory. That is, in the case where such control is used that uses a limp home program for performing a limp home operation for safely moving the vehicle when the vehicle program is not updated successfully, it is necessary to store the limp home program in the on-board control device. Cost therefore increases when it is necessary to increase the capacity of the memory for storing the limp home program.

The disclosure provides a vehicle program update system and a vehicle program update method capable of appropriately performing a limp home operation while curbing cost increases.

A first aspect of the disclosure relates to a vehicle program update system. The vehicle program update system of the first aspect is a vehicle program update system that updates a vehicle program that is used to control a vehicle by an on-board control device mounted on the vehicle to an update program received by the vehicle from an external device separate from the vehicle via wireless communication. The vehicle program update system includes a successful update determination unit and a limp home operation execution unit. The successful update determination unit is configured to determine whether an updated vehicle program is normal when an update of the vehicle program is completed. The limp home operation execution unit is configured to, when determination is made that the updated vehicle program is not normal, switch control of the vehicle from control that is performed by the on-board control device using the vehicle program to limp home control for performing a limp home operation in which the vehicle travels using a driving force from a vehicle driving force source without being controlled by the on-board control device.

A second aspect of the disclosure relates to a vehicle program update method. A vehicle program update method according to the second aspect of the disclosure is a vehicle program update method for updating a vehicle program that is used to control a vehicle by an on-board control device mounted on the vehicle to an update program received by the vehicle from an external device separate from the vehicle via wireless communication. The vehicle program update method includes: determining whether the updated vehicle program is normal when the update of the vehicle program is completed; and switching control of the vehicle from control that is performed by the on-board control device using the vehicle program to limp home control for performing a limp home operation in which the vehicle travels using a driving force from a vehicle driving force source without being controlled by the on-board control device, when determination is made that the updated vehicle program is not normal.

According to the vehicle program update system of the first aspect and the vehicle program update method of the second aspect, when the update of the vehicle program is completed and determination is made that the updated vehicle program is not normal, the control of the vehicle is switched from normal control, which is the control that is performed by the on-board control device using the vehicle program, to the limp home control for performing the limp home operation in which the vehicle travels using the driving force from the vehicle driving force source without being controlled by the on-board control device. It is therefore guaranteed that the vehicle travels with minimum functions even without being controlled by the on-board control device. In other words, the vehicle can be safely driven without storing a limp home program in the on-board control device. Accordingly, the limp home operation is appropriately performed while curbing cost increases.

In the vehicle program update system of the first aspect, the vehicle program may be a power transmission device program that is used to control a power transmission device that transmits the driving force from the vehicle driving force source. The limp home operation execution unit may be configured to perform the limp home operation in which the power transmission device is allowed to transmit the driving force without being controlled by the on-board control device.

According to the vehicle program update system of the first aspect, the limp home operation is performed in which the power transmission device is allowed to transmit the driving force from the vehicle driving force source without being controlled by the on-board control device using the transmission device program. Accordingly, the vehicle program update system with the above configuration appropriately performs the limp home operation.

In the vehicle program update system with the above configuration, the limp home operation may be the vehicle traveling with a predetermined limp home speed ratio attained in the power transmission device due to no command signal being output from the on-board control device.

According to the vehicle program update system with the above configuration, the limp home operation is the vehicle traveling with the predetermined limp home speed ratio attained in the power transmission device due to no command signal being output from the on-board control device. Accordingly, the limp home operation is appropriately performed.

In the vehicle program update system with the above configuration, the predetermined limp home speed ratio may be calculated based on energy obtained by the driving force from the vehicle driving force source.

According to the vehicle program update system with the above configuration, the predetermined limp home speed ratio is attained based on the energy obtained by the driving force from the vehicle driving force source. Accordingly, the limp home operation is appropriately performed.

In the vehicle program update system of the first aspect, the limp home operation execution unit may be configured to switch the control of the vehicle to the limp home control when determination is made that the updated vehicle program is not normal and a driver chooses to switch the control of the vehicle to the limp home control out of an option to update the vehicle program again and an option to switch the control of the vehicle to the limp home control.

According to the vehicle program update system with the above configuration, the control of the vehicle is switched to the limp home control when the driver chooses to switch the control of the vehicle to the limp home control out of the option to update the vehicle program again and the option to switch the control of the vehicle to the limp home control. This configuration meets the needs of the driver who wishes to drive with the normal control even if it takes time to update the vehicle program again or the needs of the driver who wishes to perform the limp home operation quickly and have the update of the vehicle program completed successfully by a roadside assistance company.

In the vehicle program update system of the first aspect, the limp home operation execution unit may be configured to switch the control of the vehicle to the limp home control when determination is still made that the updated vehicle program is not normal after an operation of updating the vehicle program again due to the updated vehicle program being determined to be not normal is attempted a predetermined number of times.

According to the vehicle program update system with the above configuration, the control of the vehicle is switched to the limp home control when determination is still made that the updated vehicle program is not normal after the operation of updating the vehicle program again due to the updated vehicle program being determined to be not normal is attempted the predetermined number of times. An update failure due to some external factor such as noise is therefore more likely to be avoided.

In the vehicle program update system according to the first aspect, the limp home operation execution unit may be configured to send information that the updated vehicle program is not normal and information on a current position of the vehicle to a roadside assistance company for the vehicle when the control of the vehicle is switched to the limp home control.

According to the vehicle program update system with the above configuration, the information that the updated vehicle program is not normal and the information on the current position of the vehicle are sent to the roadside assistance company for the vehicle when the control of the vehicle is switched to the limp home control. The roadside assistance company can thus smoothly handle the situation of the vehicle in which the limp home operation is being performed, which reduces inconvenience to a user of the vehicle.

In the vehicle program update system of the first aspect, the successful update determination unit may be configured to calculate a virtual vehicle behavior according to information on a command signal that is generated by the on-board control device based on virtual input information when the updated vehicle program is used in a virtual space, and determine whether the updated vehicle program is normal based on whether the virtual vehicle behavior matches the virtual input information.

According to the vehicle program update system with the above configuration, the virtual vehicle behavior is calculated according to information on the command signal that is generated by the on-board control device based on the virtual input information when the updated vehicle program is used in the virtual space, and whether the updated vehicle program is normal is determined based on whether the virtual vehicle behavior matches the virtual input information. Accordingly, it can be confirmed that there is no problem with the updated vehicle program even without actually operating the vehicle using the updated vehicle program.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

In an embodiment of the disclosure, the power transmission device includes a transmission. The speed ratio of this transmission is given by "rotational speed of an input-side rotating member/rotational speed of an output-side rotating member." A higher gear speed ratio (higher gear) has a lower numerical value and means higher vehicle speeds. A lower gear speed ratio (lower gear) has a higher numerical value and means lower vehicle speeds. For example, the lowest gear speed ratio is the speed ratio on the lowest vehicle speed side and has the highest numerical value.

The vehicle driving force source is an engine such as a gasoline engine or a diesel engine that generates power by burning fuel. The vehicle may include a rotating machine etc. as the vehicle driving force source in addition to or instead of the engine.

The embodiment of the disclosure will be described in detail with reference to the accompanying drawings.

Figure 1:
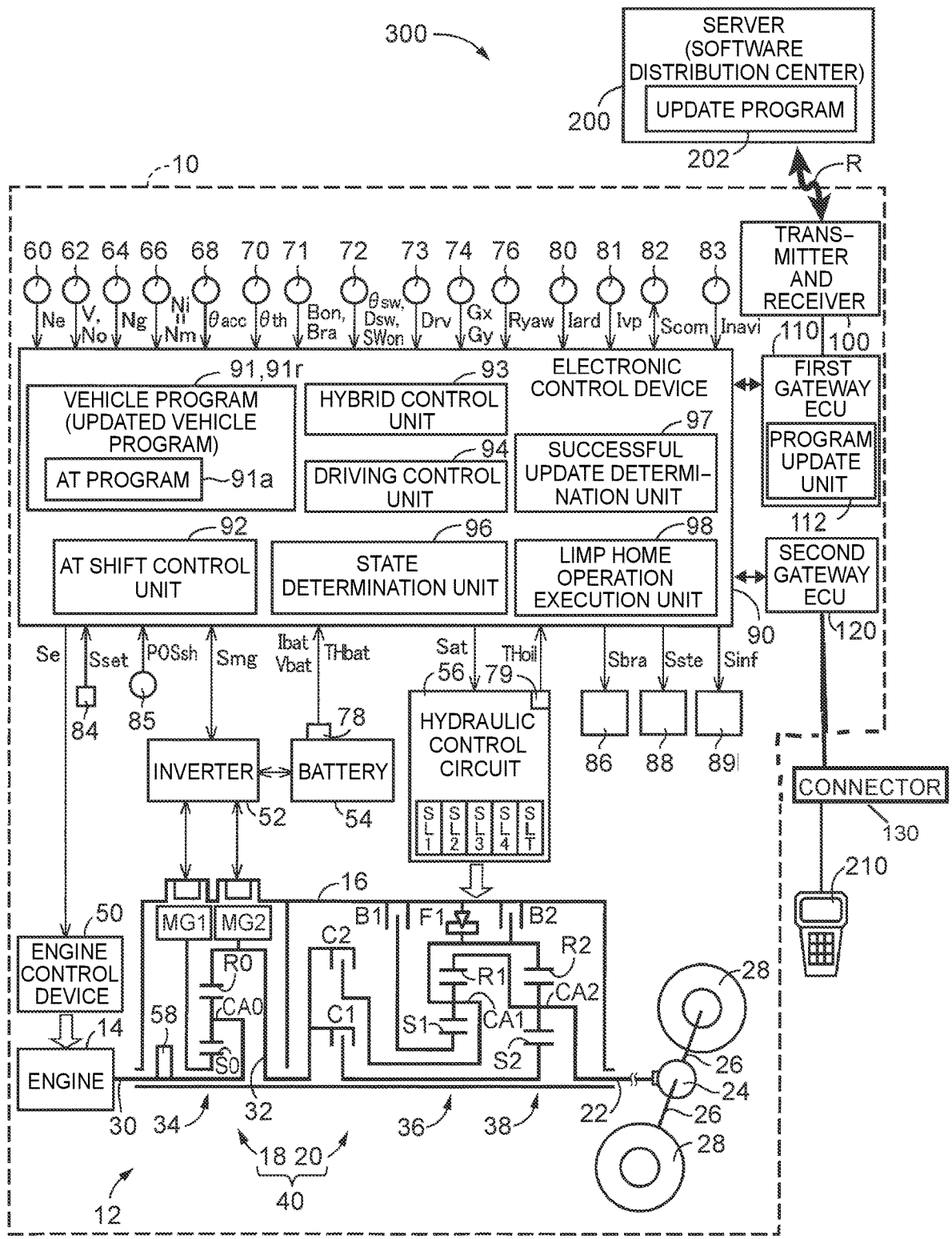
FIG. 1 illustrates a schematic configuration of a vehicle to which a vehicle program update system of the disclosure is applied and also illustrates the vehicle program update system.

FIG. 1 illustrates a schematic configuration of a vehicle 10 to which the disclosure is applied and also illustrates a main part of a control system for performing various controls in the vehicle 10. In FIG. 1, the vehicle 10 includes a power transmission device 12, an engine 14, a first rotating machine MG1, and a second rotating machine MG2.

The engine 14 is a vehicle driving force source capable of generating a driving force and is a known internal combustion engine such as a gasoline engine or a diesel engine. In the engine 14, an electronic control device 90, which will be described later, controls an engine control device 50 to control engine torque Te. The engine torque Te is output torque of the engine 14. The engine control device 50 includes a throttle actuator, fuel injection equipment, an ignition system, etc. that are mounted on the vehicle 10.

The first rotating machine MG1 and the second rotating machine MG2 are rotating electrical machines that function as an electric motor (motor) and an electric generator (generator), and are what is called motor generators. The first rotating machine MG1 and the second rotating machine MG2 are connected to a battery 54 via an inverter 52. The battery 54 and the inverter 52 are mounted on the vehicle 10. In the first rotating machine MG1 and the second rotating machine MG2, the electronic control device 90 controls the inverter 52 to control MG1 torque Tg and MG2 torque Tm. The MG1 torque Tg is output torque of the first rotating machine MG1, and the MG2 torque Tm is output torque of the second rotating machine MG2. For example, in the case where the rotating machine rotates in the forward rotation that is the same rotational direction as that of the engine 14 in operation, the output torque of the rotating machine is power running torque when the output torque is positive torque, namely, accelerating torque, and the output torque of the rotating machine is regenerative torque when the output torque is negative torque, namely decelerating torque. The battery 54 is an electrical storage device that supplies and receives electric power to and from each of the first rotating machine MG1 and the second rotating machine MG2. The first rotating machine MG1 and the second rotating machine MG2 are located in a case 16. The case 16 is a non-rotating member that is attached to a vehicle body.

The power transmission device 12 includes an electric continuously variable transmission unit 18, a mechanical stepped transmission unit 20, etc. that are arranged in series on a common axis in the case 16. The electric continuously variable transmission unit 18 is directly coupled to the engine 14 or indirectly coupled to the engine 14 via a damper, not shown, etc. The mechanical stepped transmission unit 20 is coupled to the output side of the electric continuously variable transmission unit 18. The power transmission device 12 further includes a differential gear unit 24, a pair of axles 26, etc. The differential gear unit 24 is coupled to an output shaft 22 that is an output rotating member of the mechanical stepped transmission unit 20. The axles 26 are coupled to the differential gear unit 24. The axles 26 are also coupled to drive wheels 28 of the vehicle 10. Hereinafter, the electric continuously variable transmission unit 18 is referred to as the continuously variable transmission unit 18, and the mechanical stepped transmission unit 20 is referred to as the stepped transmission unit 20. The continuously variable transmission unit 18, the stepped transmission unit 20, etc. are configured substantially symmetrically with respect to the common axis, and the lower halves of the continuously variable transmission unit 18, the stepped transmission unit 20, etc. below the common axis are not shown in FIG. 1. The common axis is an axis of a crankshaft of the engine 14, a connecting shaft 30, etc. The connecting shaft 30 is an input rotating member of the continuously variable transmission unit 18 coupled to the crankshaft.

The continuously variable transmission unit 18 includes the first rotating machine MG1 and a differential mechanism 34. The differential mechanism 34 is a power split device that mechanically splits the power of the engine 14 between the first rotating machine MG1 and an intermediate transmission member 32. The intermediate transmission member 32 is an output rotating member of the continuously variable transmission unit 18. The second rotating machine MG2 is coupled to the intermediate transmission member 32 such that power from the second rotating machine MG2 can be transmitted to the intermediate transmission member 32. The continuously variable transmission unit 18 is an electric continuously variable transmission in which the differential state of the differential mechanism 34 is controlled by controlling the operating state of the first rotating machine MG1. The continuously variable transmission unit 18 is operated as an electric continuously variable transmission whose speed ratio $\gamma 0$ (=engine speed Ne/MG2 rotational speed Nm) is changed. The engine speed Ne is the rotational speed of the engine 14 and has the same value as the input rotational speed of the continuously variable transmission unit 18, that is, the rotational speed of the connecting shaft 30. The MG2 rotational speed Nm is the rotational speed of the second rotating machine MG2 and has the same value as the output rotational speed of the continuously variable transmission unit 18, that is, the rotational speed of the intermediate transmission member 32. The first rotating machine MG1 is a rotating machine capable of controlling the engine speed Ne and corresponds to a differential rotating machine. Controlling the operating state of the first rotating machine MG1 means controlling the operation of the first rotating machine MG1.

The differential mechanism 34 is composed of a single-pinion planetary gear set and includes a sun gear S0, a carrier CA0, and a ring gear R0. The engine 14 is coupled to the carrier CA0 via the connecting shaft 30 such that power from the engine 14 can be transmitted to the carrier CA0. The first rotating machine MG1 is coupled to the sun gear S0 such that power from the first rotating machine MG1 can be transmitted to the sun gear S0. The second rotating machine MG2 is coupled to the ring gear R0 such that power from the second rotating machine MG2 can be transmitted to the ring gear R0. In the differential mechanism 34, the carrier CA0 functions as an input element, the sun gear S0 functions as a reaction element, and the ring gear R0 functions as an output element.

The stepped transmission unit 20 is a mechanical speed change mechanism that is a stepped transmission that forms a part of a power transmission path between the intermediate transmission member 32 and the drive wheels 28. That is, the stepped transmission unit 20 is a mechanical speed change mechanism that forms a part of a power transmission path between the continuously variable transmission unit 18 and the drive wheels 28. The intermediate transmission member 32 also functions as an input rotating member of the stepped transmission unit 20. The second rotating machine MG2 is coupled to the intermediate transmission member 32 such that the second rotating machine MG2 and the intermediate transmission member 32 rotate together. The second rotating machine MG2 is a rotating machine functioning as a vehicle driving force source capable of generating a driving force, and corresponds to a traction rotating machine. The engine 14 is coupled to the input side of the continuously variable transmission unit 18. The stepped transmission unit 20 is therefore an automatic transmission that forms a part of a power transmission path between the driving force source (engine 14, second rotating machine MG2) and the drive wheels 28. The stepped transmission unit 20 is a known planetary gear automatic transmission including a plurality of planetary gear sets and a plurality of engagement devices. For example, the planetary gear sets are a first planetary gear set 36 and a second planetary gear set 38, and the engagement devices are a clutch C1, a clutch C2, a brake B1, a brake B2, and a one-way clutch F1. Hereinafter, the clutch C1, the clutch C2, the brake B1, and the brake B2 are simply referred to as the engagement devices CB unless individually identified.

Each engagement device CB is a hydraulic friction engagement device that is a multi-plate or single-plate clutch or brake that is pressed by a hydraulic actuator, a band brake that is tightened by a hydraulic actuator, etc. The operating state of each engagement device CB is switched between or among the engaged state, the disengaged state, etc. by changing the torque capacity of the engagement device CB by a regulated engagement pressure for that engagement device CB. The regulated engagement pressure for each engagement device CB is output from a corresponding one of solenoid valves SL1 to SL4 etc. in a hydraulic control circuit 56 of the vehicle 10.

In the stepped transmission unit 20, a part of rotating elements of the first planetary gear set 36 and the second planetary gear set 38 is coupled together or to the intermediate transmission member 32, the case 16, or the output shaft 22, either directly or indirectly via the engagement device CB or the one-way clutch F1. The rotating elements of the first planetary gear set 36 are a sun gear S1, a carrier CA1, and a ring gear R1, and the rotating elements of the second planetary gear set 38 are a sun gear S2, a carrier CA2, and a ring gear R2.

The stepped transmission unit 20 is a stepped transmission that attains one of shift stages (also referred to as the gear stages) with different speed ratios γat (=automatic transmission (AT) input rotational speed Ni/output rotational speed No) by engaging desired ones of the engagement devices, such as predetermined engagement devices. That is, the stepped transmission unit 20 switches the gear stage, namely performs a shift operation, by engaging desired ones of the engagement devices. In the present embodiment, the gear stages that are attained by the stepped transmission unit 20 are referred to as the AT gear stages. The AT input rotational speed Ni is the input rotational speed of the stepped transmission unit 20, that is, the rotational speed of the intermediate transmission member 32, and has the same value as the MG2 rotational speed Nm. The AT input rotational speed Ni can therefore be represented by the MG2 rotational speed Nm. The output rotational speed No is the output rotational speed of the stepped transmission unit 20, that is, the rotational speed of the output shaft 22. The output rotational speed No is also the output rotational speed of a compound transmission 40. The compound transmission 40 refers to the entire combined automatic transmission of the continuously variable transmission unit 18 and the stepped transmission unit 20. The engine speed Ne is also the input rotational speed of the compound transmission 40.

Figures 2, 3:
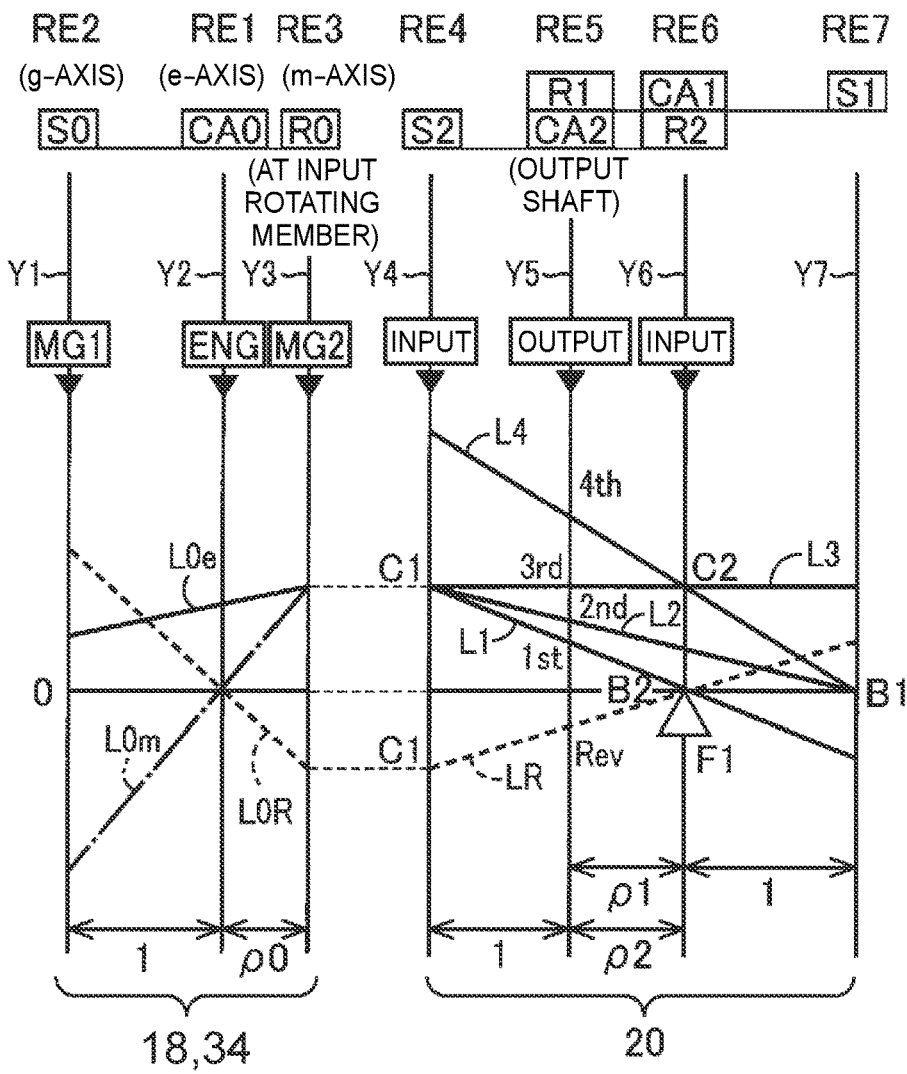
FIG. 2 is an operation table illustrating the relationship between the shift operation of a mechanical stepped transmission unit of FIG. 1 and the combination of operating states of engagement devices that are used for the shift operation.
FIG. 3 is a collinear chart illustrating the relative relationship among the rotational speeds of rotating elements in an electric continuously variable transmission unit and the mechanical stepped transmission unit.

As shown in, e.g., the engagement operation table of FIG. 2, the stepped transmission unit 20 has four forward AT gears, namely first AT gear ("1st" in the figure) to fourth AT gear ("4th" in the figure), as the AT gear stages. The speed ratio γat at first AT gear has the highest numerical value, and the higher the AT gear, the lower the numerical value of the speed ratio γat. The stepped transmission unit 20 attains a reverse AT gear stage ("Rev" in the figure) by, e.g., engaging the clutch C1 and the brake B2. The engagement operation table of FIG. 2 illustrates the relationship between each AT gear stage and the operating state of the engagement devices. That is, the engagement operation table of FIG. 2 illustrates the relationship between each AT gear stage and the predetermined engagement devices that are the engagement devices to be engaged at each AT gear stage. In FIG. 2, "◯" indicates that the engagement device is engaged, "Δ" indicates that the engagement device is engaged when the engine brake is in operation or during a coast downshift of the stepped transmission unit 20, and blank indicates that the engagement device is disengaged.

The electronic control device 90 controls the stepped transmission unit 20 to switch the AT gear stage that is attained according to the driver's accelerator operation, the vehicle speed V, etc. That is, the electronic control device 90 controls the stepped transmission unit 20 to selectively attain the AT gear stages. For example, in shift control for the stepped transmission unit 20, the stepped transmission unit 20 performs what is called a clutch-to-clutch shift. The clutch-to-clutch shift is a shift that is performed by disengaging one or two engagement devices CB and engaging other one or two engagement devices CB, namely by switching the engagement devices CB between the engaged and disengaged states.

The vehicle 10 further includes a mechanical oil pump (MOP) 58, an electric oil pump, not shown, etc. The MOP 58 is coupled to the connecting shaft 30. The MOP 58 is rotated with rotation of the engine 14 to discharge hydraulic oil OIL to be used in the power transmission device 12. The electric oil pump is driven to discharge hydraulic oil OIL while, e.g., the engine 14 is stopped, that is, while the MOP 58 is not driven. The hydraulic oil OIL discharged by the MOP 58 or the electric oil pump is supplied to the hydraulic control circuit 56. The operating state of each engagement device CB is switched by the engagement pressure for that engagement device CB regulated by the hydraulic control circuit 56 by using the hydraulic oil OIL as a source pressure.

FIG. 3 is a collinear chart illustrating the relative relationship among the rotational speeds of the rotating elements in the continuously variable transmission unit 18 and the stepped transmission unit 20. In FIG. 3, three vertical lines Y1, Y2, and Y3 corresponding to the three rotating elements of the differential mechanism 34 of the continuously variable transmission unit 18 are a g-axis, an e-axis, and an m-axis, respectively. The g-axis represents the rotational speed of the sun gear S0 corresponding to a second rotating element RE2. The e-axis represents the rotational speed of the carrier CA0 corresponding to a first rotating element RE1. The m-axis represents the rotational speed of the ring gear R0 corresponding to a third rotating element RE3 (i.e., the input rotational speed of the stepped transmission unit 20). Four vertical lines Y4, Y5, Y6, and Y7 of the stepped transmission unit 20 are axes representing the rotational speed of the sun gear S2 corresponding to a fourth rotating element RE4, the rotational speed of the ring gear R1 and the carrier CA2 coupled to each other and corresponding to a fifth rotating element RE5 (i.e., the rotational speed of the output shaft 22), the rotational speed of the carrier CA1 and the ring gear R2 coupled to each other and corresponding to a sixth rotating element RE6, and the rotational speed of the sun gear S1 corresponding to a seventh rotating element RE7, respectively. The distances between adjacent ones of the vertical lines Y1, Y2, and Y3 are determined according to a gear ratio $\rho 0$ of the differential mechanism 34, and the distances between adjacent ones of the vertical lines Y4, Y5, Y6, and Y7 are determined according to gear ratios $\rho 1$, $\rho 2$ of the first and second planetary gear sets 36, 38. When the distance between the sun gear and the carrier in the relationship between the vertical axes of the collinear chart corresponds to "1," the distance between the carrier and the ring gear corresponds to the gear ratio $\rho$ of the planetary gear set (=number of teeth of the sun gear/number of teeth of the ring gear).

Referring to the collinear chart of FIG. 3, in the differential mechanism 34 of the continuously variable transmission unit 18, the engine 14 (see "ENG" in FIG. 3) is coupled to the first rotating element RE1, the first rotating machine MG1 (see "MG1" in FIG. 3) is coupled to the second rotating element RE2, and the second rotating machine MG2 (see "MG2" in FIG. 3) is coupled to the third rotating element RE3 that rotates with the intermediate transmission member 32, so that rotation of the engine 14 is transmitted to the stepped transmission unit 20 via the intermediate transmission member 32. For the continuously variable transmission unit 18, straight lines L0e, L0m, and L0R crossing the vertical line Y2 show the relationship between the rotational speed of the sun gear S0 and the rotational speed of the ring gear R0.

In the stepped transmission unit 20, the fourth rotating element RE4 is selectively coupled to the intermediate transmission member 32 via the clutch C1. The fifth rotating element RE5 is coupled to the output shaft 22. The sixth rotating element RE6 is selectively coupled to the intermediate transmission member 32 via the clutch C2 and is selectively coupled to the case 16 via the brake B2. The seventh rotating element RE7 is selectively coupled to the case 16 via the brake B1. For the stepped transmission unit 20, straight lines L1, L2, L3, L4, and LR crossing the vertical line Y5 due to engagement and disengagement control of the engagement devices CB represent the rotational speeds of the output shaft 22 at "1st," "2nd," "3rd," "4th," and "Rev," respectively.

The straight line L0e and the straight lines L1, L2, L3, and L4, which are shown by continuous lines in FIG. 3, represent the relative rotational speeds of the rotating elements when the vehicle 10 travels in the forward direction in a hybrid drive mode (HV mode). The HV mode is a mode in which the vehicle 10 can travel using at least the engine 14 as a driving force source. In the differential mechanism 34 in the HV mode, when positive engine torque Te is applied to the carrier CA0 and MG1 torque Tg, which is negative reaction torque from the first rotating machine MG1, is applied to the sun gear S0, engine direct torque Td ($=Te/(1+\rho 0)=-(1/\rho 0)\times Tg$) is applied to the ring gear R0. The engine direct torque Td is positive for forward rotation. According to a requested driving force, the sum of the engine direct torque Td and the MG2 torque Tm is transmitted as the torque for driving the vehicle 10 in the forward direction to the drive wheels 28 via the stepped transmission unit 20 that has shifted into one of first to fourth AT gears. The first rotating machine MG1 functions as an electric generator when it generates negative torque for forward rotation. Electric power Wg generated by the first rotating machine MG1 is stored in the battery 54 or consumed by the second rotating machine MG2. The second rotating machine MG2 outputs the MG2 torque Tm using all or a part of the electric power Wg or using electric power from the battery 54 in addition to the electric power Wg.

The straight line L0m shown by a long dashed short dashed line in FIG. 3 and the straight lines L1, L2, L3, and L4 shown by continuous lines in FIG. 3 represent the relative rotational speeds of the rotating elements when the vehicle 10 travels in the forward direction in a motor drive mode (EV mode). The EV mode is a mode in which the vehicle 10 can travel using the second rotating machine MG2 as a driving force source with the engine 14 stopped. When the vehicle 10 travels in the forward direction in the EV mode, the carrier CA0 is not rotated, and the MG2 torque Tm, which is positive for positive rotation, is applied to the ring gear R0. At this time, the first rotating machine MG1 coupled to the sun gear S0 is under no load and is idled while rotating in the reverse direction. That is, when the vehicle 10 travels in the forward direction in the EV mode, the engine 14 is not driven and therefore the engine speed Ne is zero, and the MG2 torque Tm is transmitted as the torque for driving the vehicle 10 in the forward direction to the drive wheels 28 via the stepped transmission unit 20 that has shifted into one of first to fourth AT gears. In this case, the MG2 torque Tm is power running torque that is positive for forward rotation.

The straight lines L0R, LR shown by dashed lines in FIG. 3 represent the relative rotational speeds of the rotating elements when the vehicle 10 travels rearward in the EV mode. When the vehicle 10 moves rearward in the EV mode, the MG2 torque Tm, which is negative for reverse rotation, is applied to the ring gear R0. This MG2 torque Tm is transmitted as the torque for driving the vehicle 10 in the reverse direction to the drive wheels 28 via the stepped transmission unit 20 that has shifted into first AT gear. In the vehicle 10, the electronic control device 90 controls the second rotating machine MG2 to output the MG2 torque Tm for driving the vehicle 10 in the reverse direction with a lower AT gear stage for driving the vehicle 10 in the forward direction out of the AT gear stages, such as first AT gear, being attained. The vehicle 10 is thus driven in the reverse direction. The MG2 torque Tm for moving the vehicle 10 in the reverse direction is opposite in sign to the MG2 torque Tm for moving the vehicle 10 in the forward direction which is applied when the vehicle 10 travels in the forward direction. In this case, the MG2 torque Tm is power running torque that is negative for reverse rotation. In the HV mode as well, the second rotating machine MG2 can be rotated in the reverse rotation like the straight line L0R, and therefore the vehicle 10 can travel in the reverse direction as in the EV mode.

The vehicle 10 is a hybrid vehicle including the engine 14 and the second rotating machine MG2 as traction driving force sources. In the power transmission device 12, the power output from the engine 14 and the second rotating machine MG2 is transmitted to the stepped transmission unit 20 and then transmitted from the stepped transmission unit 20 to the drive wheels 28 via the differential gear unit 24 etc. The power transmission device 12 thus transmits the driving force from the driving force sources (engine 14, second rotating machine MG2) to the drive wheels 28. The power means the same as torque and force unless otherwise specified.

Referring back to FIG. 1, the vehicle 10 includes the electronic control device 90 as a controller including a control device for the vehicle 10 related to control of the engine 14, the continuously variable transmission unit 18, the stepped transmission unit 20, etc. FIG. 1 illustrates an input and output system of the electronic control device 90. FIG. 1 is a functional block diagram illustrating a main part of control functions of the electronic control device 90. The electronic control device 90 includes a microcomputer including, e.g., a CPU, a random access memory (RAM), a read only memory (ROM), an input and output interface, etc. The CPU performs various controls of the vehicle 10 by processing signals according to programs stored in advance in the ROM using the temporary storage function of the RAM. The electronic control device 90 is composed of separate units for controlling the driving force sources, for stepped shift control, etc., as needed. The electronic control device 90 is an on-board control device mounted on the vehicle 10.

The electronic control device 90 receives various signals Sss etc. based on detected values of various sensors etc. mounted on the vehicle 10. For example, the sensors include an engine speed sensor 60, an output rotational speed sensor 62, an MG1 rotational speed sensor 64, an MG2 rotational speed sensor 66, an accelerator position sensor 68, a throttle position sensor 70, a brake pedal sensor 71, a steering sensor 72, a driver condition sensor 73, a G sensor 74, a yaw rate sensor 76, a battery sensor 78, an oil temperature sensor 79, a vehicle surroundings sensor 80, a vehicle position sensor 81, an external network communication antenna 82, a navigation system 83, a driver assistance setting switch group 84, and a shift position sensor 85. For example, the signals Sss include: the engine speed Ne; the output rotational speed No corresponding to a vehicle speed V; an MG1 rotational speed Ng that is the rotational speed of the first rotating machine MG1; the MG2 rotational speed Nm that is an AT input rotational speed Ni; an accelerator operation amount θacc that is the amount of accelerator operation by a driver and indicates the extent to which the vehicle 10 is being accelerated by the driver; a throttle valve opening degree θth that is the opening degree of an electronic throttle valve; a brake-on signal Bon that is a signal indicating that a brake pedal for operating wheel brakes is being operated by the driver; a brake operation amount Bra that indicates the extent to which the brake pedal is being depressed by the driver; a steering angle θsw and a steering direction Dsw of a steering wheel of the vehicle 10; a steering-on signal SWon that is a signal indicating that the steering wheel is being held by the driver; a driver condition signal Dry that is a signal indicating the condition of the driver; longitudinal acceleration Gx and lateral acceleration Gy of the vehicle 10; a yaw rate Ryaw that is the angular velocity of rotation of the vehicle 10 about the vertical axis of the vehicle 10; a battery temperature THbat, a battery charge and discharge current Ibat, and a battery voltage Vbat of the battery 54; a hydraulic oil temperature THoil that is the temperature of the hydraulic oil OIL; vehicle surroundings information Iard; position information Ivp; a communication signal Scom; navigation information Inavi; a driver assistance setting signal Sset that is a signal indicating settings made by the driver for driver assistance control such as autonomous driving control and cruise control; and an operation position POSsh of a shift lever in the vehicle 10.

The amount of accelerator operation by the driver is the amount of acceleration operation, namely the amount of operation of an accelerator operation member such as an accelerator pedal. The amount of accelerator operation by the driver is therefore the driver's requested output amount of the vehicle 10. In addition to the accelerator operation amount θacc, the throttle valve opening degree θth etc. may be used as the driver's requested output amount.

The driver condition sensor 73 includes at least one of a camera that captures the driver's facial expressions, the pupils of the driver's eyes, etc., a biometric information sensor that detects the driver's biometric information, etc. The driver condition sensor 73 acquires the driver's condition such as the drive's line of sight, the orientation of the driver's face, movements of the driver's eyeballs and face, and the driver's heartbeat condition.

The vehicle surroundings sensor 80 includes at least one of, e.g., a light detection and ranging (LiDAR), a radar, an on-board camera, etc. and directly acquires information on a road on which the vehicle 10 is traveling and information on an object that is present around the vehicle 10. The LiDAR is either a plurality of LiDARs that detects, e.g., an object ahead of the vehicle 10, an object on the side of the vehicle 10, an object behind the vehicle 10, etc. or a single LiDAR that detects objects all around the vehicle 10. The LiDAR outputs object information on the detected object as the vehicle surroundings information Iard. The radar is a plurality of radars that detects, e.g., an object ahead of the vehicle 10, a nearby object ahead of the vehicle 10, a nearby object behind the vehicle 10, etc. The radar outputs object information on the detected object as the vehicle surroundings information Iard. The object information that is output from the LiDAR or the radar includes the distance and direction of the detected object from the vehicle 10. The on-board camera is, e.g., a monocular camera or a stereo camera that captures the area ahead of or behind the vehicle 10. The on-board camera outputs the captured information as the vehicle surroundings information Iard. The captured information includes information on the lane(s) of the road on which the vehicle 10 is traveling, a sign(s) on the road on which the vehicle 10 is traveling, a parking space(s), other vehicle(s), a pedestrian(s), and an obstacle(s) on the road on which the vehicle 10 is traveling, etc.

The vehicle position sensor 81 includes a global positioning system (GPS) antenna etc. The position information Ivp includes vehicle position information that is information indicating the current position of the vehicle 10 on the ground surface or a map based on GPS signals (orbit signals) sent from a GPS satellite.

The navigation system 83 is a known navigation system including a display, a speaker, etc. The navigation system 83 determines the position of the vehicle on prestored map data, based on the position information Ivp. The navigation system 83 displays the position of the vehicle 10 on a map displayed on the display. When a destination is input to the navigation system 83, the navigation system 83 calculates a travel route from a departure point to the destination and instructs the driver regarding the travel route etc. via the display, the speaker, etc. The navigation information Inavi includes, e.g., map information such as road information and facility information based on the map data stored in advance in the navigation system 83, etc. The road information includes information such as road types, branching and merging of roads, road grades, and speed limits. The road types include urban roads, suburban roads, mountain roads, expressways or freeways, etc. The facility information includes information such as types, locations, names, etc. of bases such as supermarkets, stores, restaurants, parking lots, parks, roadside assistance companies for the vehicle 10, the driver's home, and rest areas on expressways or freeways. The rest areas are the bases, located on, e.g., freeways or expressways, with facilities where drivers and passengers can park, eat, refuel their vehicles, etc.

The driver assistance setting switch group 84 includes switches such as an autonomous driving select switch for autonomous driving control, a cruise switch for cruise control, a switch for setting the vehicle speed in the cruise control, a switch for setting the distance to the preceding vehicle in the cruise control, and a switch for lane keep control for keeping the vehicle 10 in a set lane.

The communication signal Scom includes information such as road traffic information sent to and received from a center that is an external device such as a road traffic information communication system, and/or information such as vehicle-to-vehicle communication information directly sent to or received from other vehicle(s) located near the vehicle 10 without via the center. The road traffic information includes, e.g., information such as road congestions, road accidents, road constructions, travel times, and parking lots. The vehicle-to-vehicle communication information includes, e.g., vehicle information, traveling information, traffic environment information, etc. The vehicle information includes, e.g., information indicating the vehicle type such as a passenger car, a truck, or a two-wheeled vehicle. The traveling information includes, e.g., information such as the vehicle speed V, position information, information on operation of the brake pedal, information on blinking of turn signal lights, and information on blinking of hazard lights. The traffic environment information includes, e.g., information such as road congestions and road constructions.

The electronic control device 90 outputs various command signals Sct to the devices of the vehicle 10. For example, the devices of the vehicle 10 include the engine control device 50, the inverter 52, the hydraulic control circuit 56, the external network communication antenna 82, a wheel brake device 86, a steering system 88, and an information notification device 89. For example, the command signals Sct include an engine control command signal Se for controlling the engine 14, rotating machine control command signals Smg for controlling the first rotating machine MG1 and the second rotating machine MG2, hydraulic control command signals Sat for controlling the operating state of the engagement devices CB, the communication signal Scom, a brake control command signal Sbra for controlling braking torque that is generated by the wheel brakes, steering control command signals Sste for controlling steering of the wheels (especially the front wheels), and an information notification control command signal Sinf for giving the driver a warning or a notification.

The wheel brake device 86 is a brake device that applies braking torque generated by the wheel brakes to the wheels. The wheel brake device 86 supplies a brake hydraulic pressure to wheel cylinders of the wheel brakes according to, e.g., the driver's operation of depressing the brake pedal, etc. During normal operation, the wheel brake device 86 supplies a master cylinder hydraulic pressure to the wheel cylinders as a brake hydraulic pressure. The master cylinder hydraulic pressure is generated by a brake master cylinder, and the magnitude of the master cylinder hydraulic pressure corresponds to the brake operation amount Bra. During, e.g., anti-lock braking system (ABS) control, skid reduction control, vehicle speed control, autonomous driving control, etc., on the other hand, the wheel brake device 86 supplies a brake hydraulic pressure required for each control to the wheel cylinders in order to cause the wheel brakes to generate braking torque. The wheels are the drive wheels 28 and driven wheels, not shown.

The steering system 88 applies assist torque according to, e.g., the vehicle speed V, the steering angle θsw and the steering direction Dsw, the yaw rate Ryaw, etc. to a steering system of the vehicle 10. The steering system 88 applies torque for controlling steering of the front wheels to a steering system of the vehicle 10 during, e.g., autonomous driving control etc.

The information notification device 89 is a device that warns or notifies the driver in case of, e.g., a failure or reduced function of any component related to traveling of the vehicle 10. The information notification device 89 is, e.g., a display device such as a monitor, a display, or an alarm lamp, and/or a sound output device such as a speaker or a buzzer. The display device is a device that gives the driver a visual warning or notification. The sound output device is a device that gives the driver an auditory warning or notification.

The vehicle 10 further includes a transmitter and receiver 100, a first gateway electronic control unit (ECU) 110, a second gateway ECU 120, etc.

The transmitter and receiver 100 is a device that communicates with a server 200 that exists separately from the vehicle 10. The server 200 is thus an external device separate from the vehicle 10. Each of the first gateway ECU 110 and the second gateway ECU 120 is a control device that has a hardware configuration similar to that of the electronic control device 90 and that is provided in order to rewrite, e.g., a vehicle program 91 stored in a rewritable ROM in the electronic control device 90. The first gateway ECU 110 and the second gateway ECU 120 are on-board control devices mounted on the vehicle 10. The vehicle program 91 is a program that is used to control the vehicle by the electronic control device 90. The connector 130 is configured to connect an external rewriting device 210 that exists separately from the vehicle 10 to the vehicle 10. The external rewriting device 210 is thus an external device separate from the vehicle 10. The shape of the connector 130 and electrical signals of the connector 130 are determined by a known standard. The connector 130 can also be used as a connector for connecting a failure diagnosis system to the vehicle 10. Examples of the standard for the connector 130 include On-Board Diagnostics (OBD), World-Wide Harmonized-OBD (WWH-OBD), Keyword Protocol (KWP), and Unified Diagnostic Services (UDS). The connector 130 is called an OBD connector, a DLC connector, a failure diagnosis connector, etc.

Figure 4:
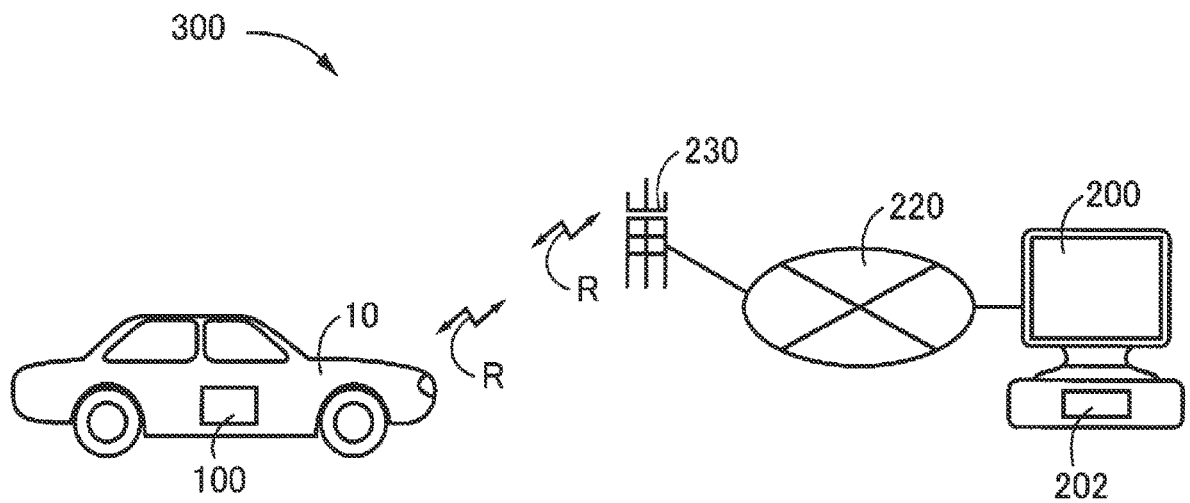
FIG. 4 illustrates an example of a configuration that updates a vehicle program via wireless communication.

As shown in FIG. 4, the server 200 is a system connected to a network 220 outside the vehicle 10. The server 200 has stored therein an uploaded update program 202. The server 200 sends the update program 202 to the vehicle 10 as needed. The server 200 functions as a software distribution center that distributes the update program 202 etc. The update program 202 is a program for rewriting the vehicle program 91 and is the program after update of the vehicle program 91. The external rewriting device 210 is directly connected to an in-vehicle communication network. Like the electronic control device 90 etc., the external rewriting device 210 can receive Controller Area Network (CAN) frames from the in-vehicle communication network and send CAN frames to the in-vehicle communication network.

As shown in FIG. 4, the transmitter and receiver 100 is connected to the network 220 via wireless communication R between the vehicle 10 and a wireless device 230. The wireless device 230 is a transmission and reception device that is connected to the network 220 and that sends and receives various signals via the wireless communication R. The first gateway ECU 110 is connected to the transmitter and receiver 100 and is configured to rewrite the vehicle program 91 into the update program 202 received by the transmitter and receiver 100 from the server 200 via the wireless communication R. The second gateway ECU 120 is connected to the connector 130 and is configured to rewrite the vehicle program 91 using the external rewriting device 210 that is connected to the second gateway ECU 120 via the connector 130. The vehicle 10 may carry out the wireless communication R with the server 200 via the external network communication antenna 82. The vehicle 10 and the external rewriting device 210 are configured to be connected by wire via the connector 130. However, the vehicle 10 and the external rewriting device 210 may be configured to be connected wirelessly. For convenience, the vehicle program 91 is herein described as data to be rewritten. However, vehicle software, vehicle data, etc. may also be the data to be rewritten.

The first gateway ECU 110 includes program update means, namely a program update unit 112, in order to implement control for updating the vehicle program 91. The program update unit 112 determines whether the update program 202 is present on the server 200. When the program update unit 112 determines that the update program 202 is present on the server 200, the program update unit 112 receives the update program 202, namely downloads the update program 202, from the server 200 via the wireless communication R. The program update unit 112 rewrites the vehicle program 91 into the update program 202 received from the server 200, that is, updates the vehicle program 91 to the update program 202.

The electronic control device 90 further includes AT shift control means, hybrid control means, and driving control means, namely an AT shift control unit 92, a hybrid control unit 93, and a driving control unit 94, in order to implement various controls in the vehicle 10.

Figure 5:
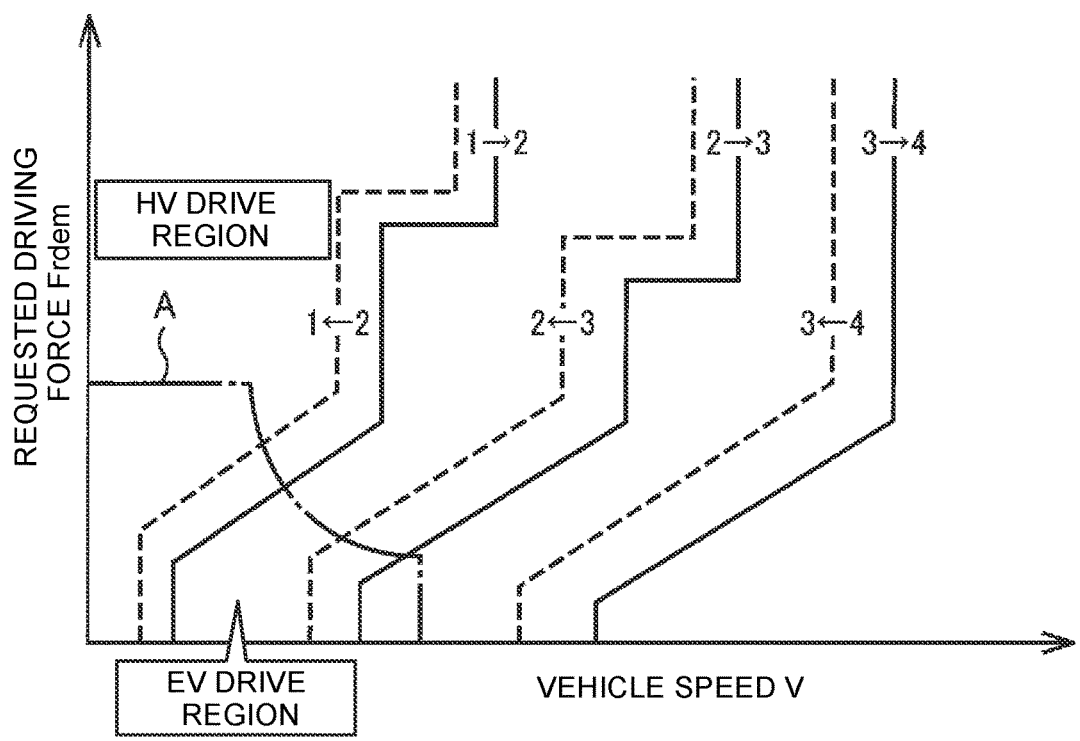
FIG. 5 is a graph illustrating an example of an automatic transmission (AT) gear shift map that is used for shift control of the mechanical stepped transmission unit of FIG. 1 and a drive mode switch map that is used for drive mode switch control and also illustrating the relationship between the AT gear shift map and the drive mode switch map.

The AT shift control unit 92 determines whether the stepped transmission unit 20 should shift by using, e.g., an AT gear shift map shown in FIG. 5, and outputs the hydraulic control command signals Sat for performing shift control of the stepped transmission unit 20 to the hydraulic control circuit 56 as needed. The AT gear shift map is a predetermined relationship, namely a relationship obtained experimentally or by design and stored in advance. Specifically, the AT gear shift map is a predetermined relationship having shift lines for determining whether the stepped transmission unit 20 should shift on a two-dimensional coordinate system whose variables are, e.g., the vehicle speed V and the requested driving force Frdem. The output rotational speed No etc. may be used instead of the vehicle speed V. Requested driving torque Trdem, the accelerator operation amount θacc, the throttle valve opening degree θth, etc. may be used instead of the requested driving force Frdem. The shift lines on the AT gear shift map are upshift lines for determining whether the stepped transmission unit 20 should perform an upshift as shown by each continuous line and downshift lines for determining whether the stepped transmission unit 20 should perform a downshift as shown by each dashed line.

The hybrid control unit 93 includes functions of engine control means, namely an engine control unit, that controls the operation of the engine 14, and functions of rotating machine control means, namely a rotating machine control unit, that controls the operation of the first rotating machine MG1 and the second rotating machine MG2 via the inverter 52. The hybrid control unit 93 performs hybrid drive control etc. by the engine 14, the first rotating machine MG1, and the second rotating machine MG2 by using these control functions.

The hybrid control unit 93 calculates the requested driving force Frdem for the drive wheels 28 as a requested driving amount by applying the accelerator operation amount θacc and the vehicle speed V to, e.g., a requested driving amount map. The requested driving amount map is a predetermined relationship. In addition to the requested driving force Frdem (N), the requested driving torque Trdem (Nm) for the drive wheels 28, requested driving power Prdem (W) for the drive wheels 28, requested AT output torque for the output shaft 22, etc. may be used as the requested driving amount. The hybrid control unit 93 outputs the engine control command signal Se and the rotating machine control command signals Smg so as to achieve the requested driving power Prdem based on the requested driving torque Trdem and the vehicle speed V in view of chargeable power Win and dischargeable power Wout of the battery 54. The engine control command signal Se is a command signal for controlling the engine 14, and the rotating machine control command signals Smg are command signals for controlling the first rotating machine MG1 and the second rotating machine MG2. For example, the engine control command signal Se is a command value for engine power Pe. The engine power Pe is the power of the engine 14 that outputs the engine torque Te at the engine speed Ne at that time. For example, the rotating machine control command signals Smg are a command value for the electric power Wg generated by the first rotating machine MG1 that outputs as the reaction torque of the engine torque Te the MG1 torque Tg at the MG1 rotational speed Ng at the time a command is output, and a command value for electric power Wm consumed by the second rotating machine MG2 that outputs the MG2 torque Tm at the MG2 rotational speed Nm at the time a command is output.

The chargeable power Win of the battery 54 is the electric power that can be stored in the battery 54 and that defines the limit of the input power of the battery 54. The dischargeable power Wout of the battery 54 is the electric power that can be discharged from the battery 54 and that defines the limit of the output power of the battery 54. The chargeable power Win and the dischargeable power Wout of the battery 54 are calculated by the electronic control device 90 based on, e.g., the battery temperature THbat and the state-of-charge value SOC (%) that corresponds to the amount of charge remaining in the battery 54. The state-of-charge value SOC of the battery 54 is a value indicating the state of charge of the battery 54 and is calculated by the electronic control device 90 based on, e.g., the battery charge and discharge current Ibat, the battery voltage Vbat, etc.

For example, in the case where the continuously variable transmission unit 18 is operated as a continuously variable transmission to operate the compound transmission 40 as a continuously variable transmission as a whole, the hybrid control unit 93 performs stepless shift control of the continuously variable transmission unit 18 and changes the speed ratio γ0 of the continuously variable transmission unit 18 by controlling the engine 14 and the electric power Wg that is generated by the first rotating machine MG1. At this time, the hybrid control unit 93 controls the engine 14 and the electric power Wg in view of an optimal engine operating point etc. so as to achieve the engine speed Ne and the engine torque Te that provide the engine power Pe achieving the requested driving power Prdem. As a result of this control, the speed ratio γt (=γ0×γat=Ne/No) of the compound transmission 40 that is operated as a continuously variable transmission is controlled. The optimal engine operating point is determined in advance as the engine operating point at which the overall fuel efficiency of the vehicle 10 obtained in view of the fuel efficiency of the engine 14 alone, the charge and discharge efficiency of the battery 54, etc. is highest when achieving, e.g., requested engine power Pedem. The engine operating point is the operating point of the engine 14 represented by the engine speed Ne and the engine torque Te.

For example, in the case where the continuously variable transmission unit 18 is caused to shift like a stepped transmission to cause the compound transmission 40 to shift like a stepped transmission as a whole, the hybrid control unit 93 determines whether the compound transmission 40 should shift by using, e.g., a stepped shift map. The stepped shift map is a predetermined relationship. The hybrid control unit 93 then performs, cooperatively with the AT shift control unit 92 performing shift control of the AT gear stages of the stepped transmission unit 20, shift control of the continuously variable transmission unit 18 so as to selectively attain the gear stages with different speed ratios γt. The gear stages can be attained by controlling the engine speed Ne by the first rotating machine MG1 according to the output rotational speed No so that their speed ratios γt are maintained.

The hybrid control unit 93 selectively switches the drive mode to the EV mode or the HV mode according to the traveling state of the vehicle 10. For example, the hybrid control unit 93 selects the EV mode when the requested driving power Prdem is in an EV drive region that is smaller than a predetermined threshold. The hybrid control unit 93 selects the HV mode when the requested driving power Prdem is in an HV drive region that is equal to or larger than the predetermined threshold. Long dashed short dashed line A in FIG. 5 represents the boundary between the HV drive region and the EV drive region for switching between the HV mode and the EV mode. A predetermined relationship having such a boundary as shown by long dashed short dashed line A in FIG. 5 is an example of a drive mode switch map on a two-dimensional coordinate system whose variables are the vehicle speed V and the requested driving force Frdem. In FIG. 5, this drive mode switch map is shown together with the AT gear shift map for convenience.

Even when the requested driving power Prdem is in the EV drive region, the hybrid control unit 93 selects the HV mode when the state-of-charge value SOC of the battery 54 is smaller than a predetermined engine start threshold, when it is necessary to warm up the engine 14, etc. The engine start threshold is a predetermined threshold for determining that the state-of-charge value SOC indicates that it is necessary to forcibly start the engine 14 to charge the battery 54.

When the hybrid control unit 93 selects the HV mode while the engine 14 is stopped, the hybrid control unit 93 performs engine start control for starting the engine 14. For example, the hybrid control unit 93 starts the engine 14 by increasing the engine speed Ne by the first rotating machine MG1 and causing ignition when the engine speed Ne becomes equal to or higher than a predetermined ignitable rotational speed at which ignition can be caused. That is, the hybrid control unit 93 starts the engine 14 by cranking the engine 14 by the first rotating machine MG1.

The driving control unit 94 can perform the following types of driving control of the vehicle 10: manual driving control in which the vehicle 10 is driven based on the driver's driving operations, and driver assistance control in which the vehicle 10 is driven without depending on the driver's driving operations. The manual driving control is driving control in which the vehicle 10 is driven by manual driving based on the driver's driving operations. The manual driving is a driving method in which the vehicle 10 is normally driven by the driver's driving operations such as an accelerator operation, a brake operation, and a steering operation. The driver assistance control is driving control in which the vehicle 10 is moved by, e.g., driver assistance that automatically assists in driving operations. The driver assistance is a driving method in which the vehicle 10 is driven by automatically performing acceleration, deceleration, braking, etc. as controlled by the electronic control device 90 based on signals, information, etc. from various sensors without depending on the driver's driving operations (driver's intension). An example of the driver assistance control is autonomous driving control in which a desired traveling state is automatically set based on, e.g., a destination input by the driver, map information, etc. and the vehicle 10 is autonomously driven by automatically performing acceleration, deceleration, braking, steering, etc. based on the desired traveling state. The driver assistance control may include cruise control in which the driver performs a part of driving operations such as a steering operation, and acceleration, deceleration, braking, etc. are automatically performed.

When the autonomous driving select switch, the cruise switch, etc. of the driver assistance setting switch group 84 are off and driving by the driver assistance is not selected, the driving control unit 94 selects a manual driving mode to perform the manual driving control. The driving control unit 94 performs the manual driving control by outputting commands to control the stepped transmission unit 20, the engine 14, the rotating machines MG1, MG2 to the AT shift control unit 92 and the hybrid control unit 93.

When the autonomous driving select switch of the driver assistance setting switch group 84 is operated by the driver and automatic driving is selected, the driving control unit 94 selects an autonomous driving mode to perform the autonomous driving control. Specifically, the driving control unit 94 automatically sets a desired traveling state based on a destination input by the driver, vehicle position information based on the position information Ivp, map information based on the navigation information Inavi etc., various kinds of information regarding the road on which the vehicle 10 is traveling based on the vehicle surroundings information Iard, etc. The driving control unit 94 performs the autonomous driving control by outputting the brake control command signal Sbra for obtaining required braking torque to the wheel brake device 86 and outputting the steering control command signals Sste for controlling steering of the front wheels to the steering system 88 in addition to outputting commands to control the stepped transmission unit 20, the engine 14, the rotating machines MG1, MG2 to the AT shift control unit 92 and the hybrid control unit 93 so as to automatically perform acceleration, deceleration, braking, and steering based on the set desired traveling state.

The electronic control device 90 forms a part of a vehicle program update system 300 that updates the vehicle program 91. FIG. 1 illustrates the vehicle program update system 300 including the electronic control device 90 etc. In FIG. 1, the vehicle program update system 300 includes the electronic control device 90, the transmitter and receiver 100, the first gateway ECU 110, the server 200, the wireless device 230 (see FIG. 4), etc. The vehicle program update system 300 updates at least a part of the vehicle program 91 to the update program 202 received by the vehicle 10 from the server 200 via the wireless communication R.

There is a possibility that an abnormality may occur in the updated vehicle program 91 that is the program after update of the current vehicle program 91 to the update program 202, namely an updated vehicle program 91r. If an abnormality occurs in the updated vehicle program 91r, the electronic control device 90 can no longer control the vehicle 10. In the case where the vehicle program 91 is updated by a professional such as a repair shop of the vehicle 10 or a dealership (dealer) 240 of the vehicle 10 (see FIG. 10 that will be described later), it is easy for the professional to fix the abnormality in the updated vehicle program 91r. However, in the case where the vehicle program 91 is updated to the update program 202 received from the server 200 via the wireless communication R, it may be difficult for the professional to fix the abnormality in the updated vehicle program 91r.

One possible solution to this problem is to store, e.g., a limp home program in advance in a non-rewritable ROM in the electronic control device 90, and when an abnormality occurs in the updated vehicle program 91r, perform a limp home operation using the limp home program, such as moving the vehicle 10 to a safe place or moving the vehicle 10 to a repair shop etc. However, cost increases when it is necessary to increase the capacity of the ROM that stores the limp home program.

The vehicle program 91 includes, e.g., an ENG program, an MG program, a power transmission device program, especially an AT program 91a, etc. The ENG program is a program that is used by the electronic control device 90 to control the engine 14. The MG program is a program that is used by the electronic control device 90 to control the first rotating machine MG1 and the second rotating machine MG2. The power transmission device program is a program that is used by the electronic control device 90 to control the power transmission device 12. The AT program 91a is a program that is used by the electronic control device 90 to control the stepped transmission unit 20. In the present embodiment, the vehicle program 91 having the above problem is especially the AT program 91a.

In the present embodiment, as a solution to the above problem, the electronic control device 90 switches the control of the vehicle 10 from normal control CTnm that is performed by the electronic control device 90 to limp home control CT1p that does not depend on control by the electronic control device 90, when the vehicle program 91 is not updated successfully. The normal control CTnm is control in which the vehicle is controlled by the electronic control device 90 using the vehicle program 91. Specifically, in the normal control CTnm, the electronic control device 90 outputs the hydraulic control command signals Sat using, e.g., the AT program 91a to control the stepped transmission unit 20. The limp home control CT1p is control in which the vehicle is controlled without being controlled by the electronic control device 90. Specifically, in the limp home control CT1p, the limp home operation is performed so that the vehicle 10 travels using the driving force from the driving force sources (engine 14, second rotating machine MG2). In the present embodiment, the control mode in which the normal control CTnm is performed is referred to as the normal control mode, and the control mode in which the limp home control CT1p is performed is referred to as "the limp home control mode" or "the limp home mode". Hereinafter the term of "the limp home mode" is used through in the explanations and the drawings. The limp home mode of the present embodiment does not require a limp home program separate from the vehicle program 91, such as a program for the limp home control CT1p. Cost increases are thus curved.

Specifically, in order to implement the vehicle program update system 300 that can appropriately perform the limp home operation while curbing cost increases, the electronic control device 90 further includes state determination means, successful update determination means, and limp home operation execution means, namely a state determination unit 96, a successful update determination unit 97, and a limp home operation execution unit 98.

The state determination unit 96 determines whether the program update unit 112 has completed updating the vehicle program 91 to the update program 202.

When the state determination unit 96 determines that the update of the vehicle program 91 is completed, the successful update determination unit 97 determines whether the updated vehicle program 91r is normal. The successful update determination unit 97 determines whether the updated vehicle program 91r is normal by, e.g., comparing the update program 202 downloaded to the vehicle 10 and the updated vehicle program 91r in the memory to see whether there is any difference therebetween. Alternatively, the successful update determination unit 97 determines whether the updated vehicle program 91r is normal by running the updated vehicle program 91r in, e.g., a virtual space 310 to see whether abnormal control is performed.

Figure 6:
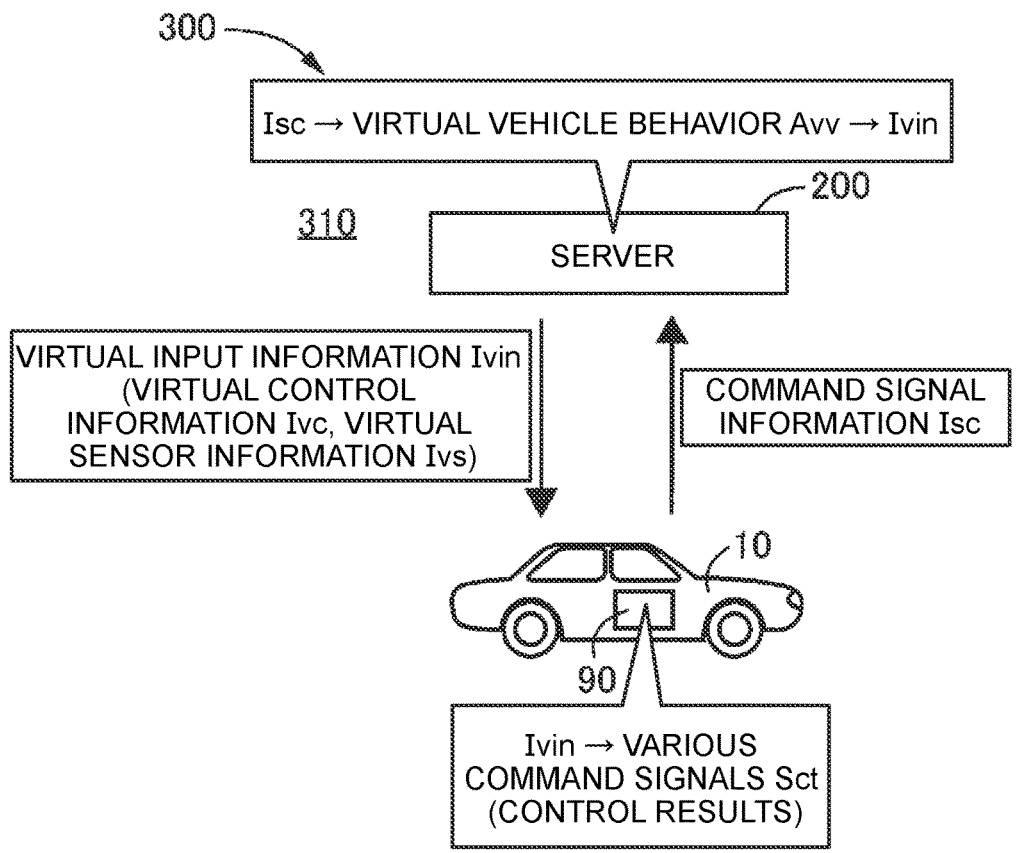
FIG. 6 illustrates an example of checking the operation of an updated vehicle program in a virtual space.

FIG. 6 illustrates an example of checking the operation of the updated vehicle program 91r in the virtual space 310 by the successful update determination unit 97. The virtual space 310 is a virtual space created by the vehicle program update system 300. In FIG. 6, the server 200 sends virtual input information Ivin, which is virtual input information in this operation, to the vehicle 10 that has completed the update of the vehicle program 91. The virtual input information Ivin is, e.g., virtual control information Ivc, virtual sensor information Ivs, etc. The virtual control information Ivc is, e.g., information on environmental factors for controlling the vehicle 10. Specifically, the virtual control information Ivc is information on virtual values such as the accelerator operation amount θacc and road surface friction resistance. The virtual sensor information Ivs is information on detection signals of sensors related to input to the power transmission device 12 and output from the power transmission device 12. Specifically, the virtual sensor information Ivs is information on virtual values such as input torque, input rotational speed, output torque, and output rotational speed. The electronic control device 90 calculates the control results that are obtained when the updated vehicle program 91r is used, based on the virtual input information Ivin. The control results are the various command signals Sct for controlling the power transmission device 12 and the driving force sources (engine 14, second rotating machine MG2). The electronic control device 90 sends command signal information Isc, which is information on the various command signals Sct, to the server 200. The server 200 calculates a virtual vehicle behavior Avv, which is a virtual vehicle behavior of the vehicle 10, based on the command signal information Isc, and sends virtual input information Ivin for the subsequent step to the vehicle 10. A series of control operations from the transmission of the virtual input information Ivin to the calculation of the virtual vehicle behavior Avv is repeatedly performed. The server 200 or the electronic control device 90 determines whether the updated vehicle program 91r is normal by determining whether the virtual vehicle behavior Avv is the vehicle behavior required from the virtual input information Ivin. Determining whether the virtual vehicle behavior Avv is the vehicle behavior required from the virtual input information Ivin means determining whether the vehicle behavior estimated from the virtual input information Ivin can be considered the same as the virtual vehicle behavior Avv, namely determining whether the virtual vehicle behavior Avv matches the virtual input information Ivin. Specific examples of criteria for determining whether the virtual vehicle behavior Avv is the vehicle behavior required from the virtual input information Ivin include that there are no abnormal fluctuations in output rotational speed No as the vehicle behavior, and that control of the power transmission device 12 is finished within a specified time. When checking the operation of the updated vehicle program 91r in the virtual space 310, it is not necessary to actually operate the vehicle 10 using the updated vehicle program 91r. Moreover, checking the operation of the updated vehicle program 91r in the virtual space 310 does not mean comparing the update program 202 downloaded to the vehicle 10 with the updated vehicle program 91r. It is therefore possible to check the operation of the updated vehicle program 91r even when the update program 202 downloaded to the vehicle 10 is not normal due to an error in download etc.

As described above, the successful update determination unit 97 calculates the virtual vehicle behavior Avv according to the command signal information Isc sent from the electronic control device 90 based on the virtual input information Ivin when the updated vehicle program 91r is used in the virtual space 310. The successful update determination unit 97 then determines whether the updated vehicle program 91r is normal based on whether the virtual vehicle behavior Avv matches the virtual input information Ivin. In the case where the operation of the updated vehicle program 91r is checked in the virtual space 310 as shown in FIG. 6, a part of the functions of the successful update determination unit 97 is included in the server 200.

The successful update determination unit 97 determines whether the update of the vehicle program 91 is completed successfully, based on whether the updated vehicle program 91r is normal.

When the successful update determination unit 97 determines that the updated vehicle program 91r is normal, that is, the update of the vehicle program 91 is completed successfully, the electronic control device 90 controls the vehicle 10 in the normal control mode.

Figure 7:
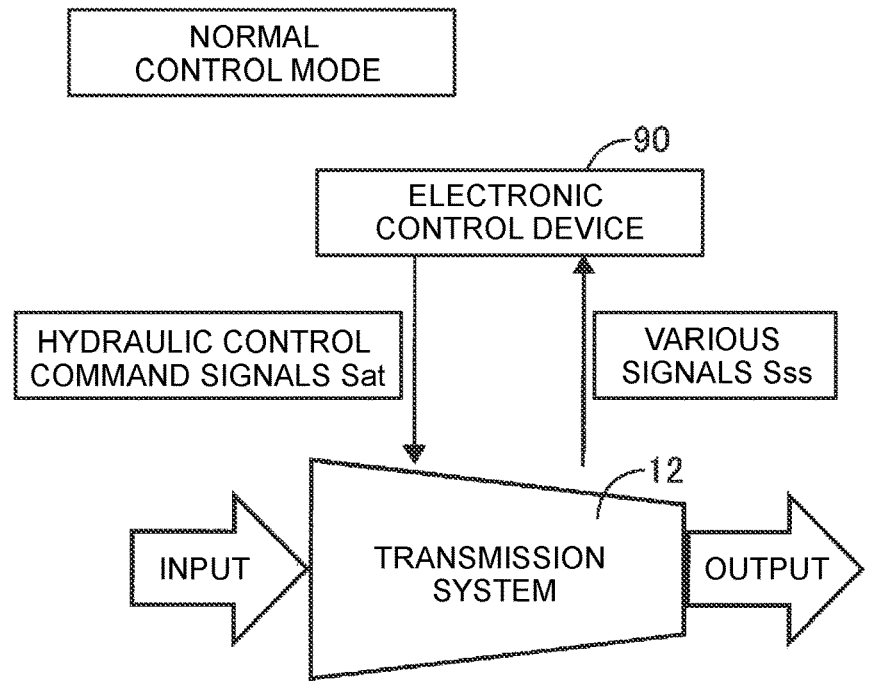
FIG. 7 illustrates an example of control of the vehicle in a normal control mode.

FIG. 7 illustrates an example of the control of the vehicle 10 in the normal control mode. Referring to FIG. 7, in the normal control mode, the electronic control device 90, especially the AT shift control unit 92, outputs the hydraulic control command signals Sat for controlling the power transmission device 12, especially the stepped transmission unit 20, based on the various signals Sss etc. from the various sensors etc. In the normal control mode, the components of the power transmission device 12 are operated according to the hydraulic control command signals Sat etc. from the electronic control device 90, and the power transmission device 12 is thus controlled according to the hydraulic control command signals Sat etc. The input rotational speed of the power transmission device 12, input torque to the power transmission device 12, input vibrations to the power transmission device 12, etc. are thus converted to a desired output rotational speed, desired output torque, desired output vibrations, etc.

When the successful update determination unit 97 determines that the updated vehicle program 91r is not normal, that is, the update of the vehicle program 91 is not completed successfully, the limp home operation execution unit 98 switches the control mode from the normal control mode to the limp home mode. In the limp home mode, the limp home operation execution unit 98 prohibits the electronic control device 90, especially the AT shift control unit 92, from outputting the hydraulic control command signals Sat. That is, when the successful update determination unit 97 determines that the updated vehicle program 91r is not normal, the limp home operation execution unit 98 switches from the normal control CTnm that is performed by the electronic control device 90 to the limp home control CT1p to change the control of the vehicle 10.

Figure 8:
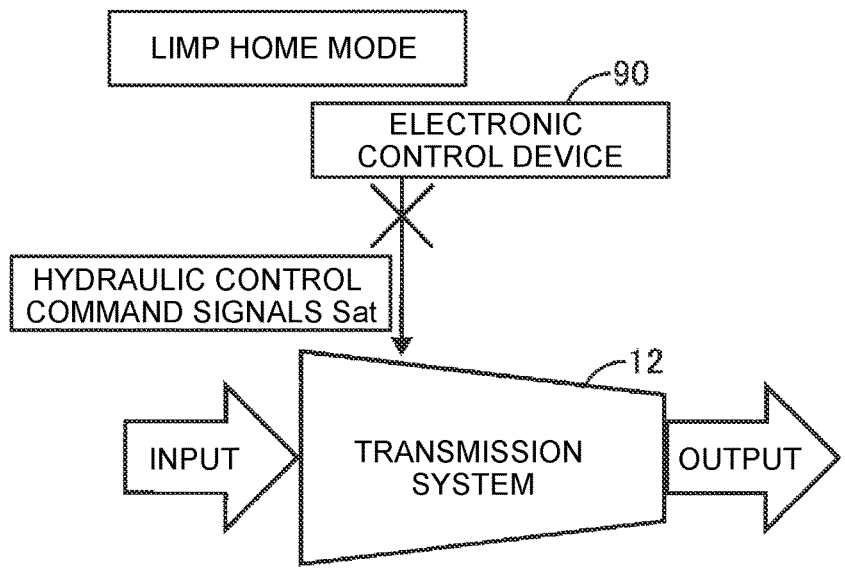
FIG. 8 illustrates an example of control of the vehicle in a limp home mode.

FIG. 8 illustrates an example of the control of the vehicle 10 in the limp home mode. Referring to FIG. 8, in the limp home mode, the electronic control device 90, especially the AT shift control unit 92, does not output the hydraulic control command signals Sat for controlling the power transmission device 12, especially the stepped transmission unit 20. In the limp home mode, the power transmission device 12 does not receive the hydraulic control command signals Sat from the electronic control device 90 and is operated by predetermined failsafe control CTfs. The power transmission device 12 is thus controlled independently of the electronic control device 90. That is, the system or the device (power transmission device 12) are controlled by a "stand-alone" that functions without being controlled by other resource (electronic control device 90).

Specifically, the hydraulic control circuit 56 is configured to switch the operating state of the solenoid valves SL1 to SL4 so that the stepped transmission unit 20 can attain a predetermined limp home shift stage, when power supply to a part of the solenoid valves SL1 to SL4, a solenoid valve SLT for regulating the source pressure for each solenoid valve SL1 to SL4, etc. is cut off. The failsafe control CTfs is control of the vehicle 10 in which power supply to a part of the solenoid valves SL1 to SL4, SLT, etc. in the hydraulic control circuit 56 is cut off so that the stepped transmission unit 20 attains the predetermined limp home shift stage even without receiving the hydraulic control command signals Sat. For example, the predetermined limp home shift stage is a predetermined AT gear stage of the stepped transmission unit 20 at which the speed ratio γt of the compound transmission 40 in the power transmission device 12 becomes the predetermined limp home speed ratio suitable for the limp home operation.

Alternatively, the hydraulic control circuit 56 is configured to switch the operating state of the solenoid valves SL1 to SL4 so that the stepped transmission unit 20 can attain the predetermined limp home shift stage using hydraulic oil OIL discharged from the MOP 58 and/or the electric oil pump, not shown, as a source pressure, when power supply to the solenoid valves SL1 to SL4, SLT, etc. is completely cut off. The failsafe control CTfs is control of the vehicle 10 in which power supply to the solenoid valves SL1 to SL4, SLT, etc. in the hydraulic control circuit 56 is completely cut off so that the stepped transmission unit 20 attains the predetermined limp home shift stage even without receiving the hydraulic control command signals Sat. The MOP 58 is rotationally driven by the engine 14, and the electric oil pump is rotationally driven by the electric power from the battery 54. The predetermined limp mode speed ratio is attained based on the energy obtained by the driving force from the engine 14.

The limp home operation using the failsafe control CTfs is an operation in which the vehicle 10 travels with the predetermined limp home speed ratio attained in the power transmission device 12 due to no hydraulic control command signal Sat being output from the electronic control device 90. The shift control of the stepped transmission unit 20 using such an AT gear shift map as shown in FIG. 5 is not performed in the limp home mode.

As described above, the limp home operation execution unit 98 executes the limp home operation in which the power transmission device 12 can transmit the driving force from the driving force sources (engine 14, second rotating machine MG2) without being controlled by the electronic control device 90.

In the limp home operation using the failsafe control CTfs, the hydraulic control command signals Sat are not output, but the engine control command signal Se and the rotating machine control command signals Smg for controlling the driving force sources (engine 14, second rotating machine MG2) are output. Accordingly, for example, the speed ratio γ0 of the continuously variable transmission unit 18 can be changed in the limp home operation using the failsafe control CTfs. In the limp home mode, a predetermined limp home speed ratio in the compound transmission 40 can be changed according to the vehicle speed V and the requested driving force Frdem by changing the speed ratio γ0 of the continuously variable transmission unit 18 for the predetermined limp home shift stage attained by the stepped transmission unit 20. The engine 14 is thus controlled at the engine operating points in view of the optimal engine operating point etc. even in, e.g., the limp home mode.

The limp home operation execution unit 98 may switch the control of the vehicle 10 to the limp home control CT1*p* when the successful update determination unit 97 determines that the updated vehicle program 91*r* is not normal and the driver chooses to switch the control of the vehicle 10 to the limp home control CT1*p*.

Figure 9:
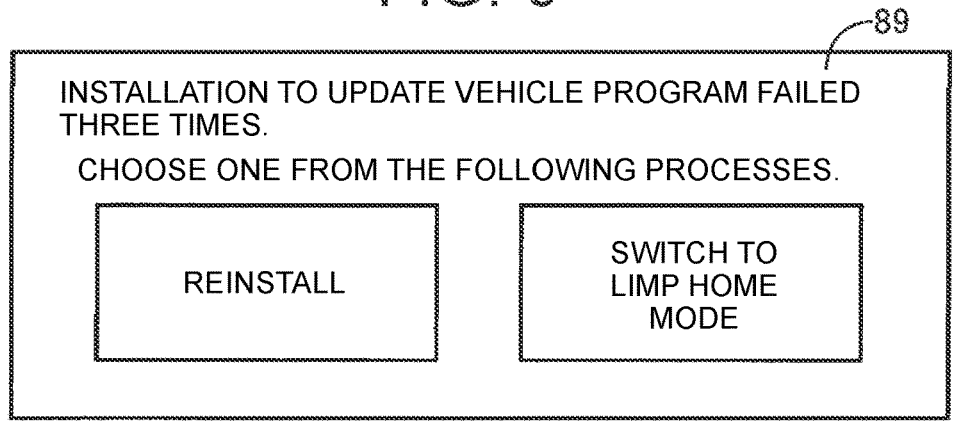
FIG. 9 illustrates an example of a notification screen that is displayed to prompt a driver to choose whether to switch the control mode to the limp home mode.

FIG. 9 illustrates an example of a notification screen that is displayed to prompt the driver to choose whether to switch the control mode to the limp home mode. For example, the screen is displayed on the information notification device 89. Referring to FIG. 9, when it is determined that the updated vehicle program 91*r* is not normal, the driver is given an option to execute reinstallation in addition to an option to switch the control mode to the limp home mode. For example, executing reinstallation means that the vehicle program 91 is updated again by the program update unit 112. When prompting the driver to choose whether to switch the control mode to the limp home mode, the number of installation attempts, namely the number of attempts to update the vehicle program 91, and the time it has taken to make the installation attempts, etc. may be displayed as information for the driver to make a decision. Although a message saying that installation failed three times is displayed in FIG. 9, the number of installation attempts may be any number. When "switch to limp home mode" is selected, functional restrictions in the vehicle 10 that will be placed when the control mode is switched to the limp home mode may be displayed, and the control mode may be switched to the limp home mode after the driver's consent is obtained. For example, the functional restrictions in the vehicle 10 include that the shift control of the stepped transmission unit 20 using such an AT gear shift map as shown in FIG. 5 will not be performed.

As described above, the limp home operation execution unit 98 switches the control of the vehicle 10 to the limp home control CT1*p* when the successful update determination unit 97 determines that the updated vehicle program 91*r* is not normal and the driver chooses to switch the control of the vehicle 10 to the limp home control CT1*p* out of the option to update the vehicle program 91 again and the option to switch the control of the vehicle 10 to the limp home control CT1*p*.

Alternatively, the limp home operation execution unit 98 may switch the control of the vehicle 10 to the limp home control CT1*p* after reinstallation is executed a predetermined number of times. That is, the limp home operation execution unit 98 switches the control of the vehicle 10 to the limp home control CT1*p* when the successful update determination unit 97 still determines that the updated vehicle program 91*r* is not normal after the program update unit 112 attempts to update the vehicle program 91 a predetermined number of times as a result of the determination of the successful update determination unit 97 that the updated vehicle program 91*r* is not normal. For example, the predetermined number of times is the number of reinstallations determined in advance in order to facilitate successful update of the vehicle program 91 while reducing a delay in performing the control of the vehicle 10 due to the reinstallations.

Since the functions in the vehicle 10 are limited in the limp home mode, the user of the vehicle 10 may feel inconvenience. Accordingly, when the vehicle 10 travels in the limp home mode, it is desired that a roadside assistance company for the vehicle 10 smoothly take care of the abnormality by, e.g., sending a professional to the vehicle 10 or sending a tow truck to move the vehicle 10. When the limp home operation execution unit 98 changes the control of the vehicle 10 by switching the control mode from the normal control mode to the limp home mode, the limp home operation execution unit 98 may send the roadside assistance company for the vehicle 10 the information that the control of the vehicle 10 has been changed. The roadside assistance company for the vehicle 10 is a base where the vehicle 10 is maintained and repaired, such as a repair shop for the vehicle 10 or the dealer 240 for the vehicle 10 (see FIG. 10 that will be described below).

Figure 10:
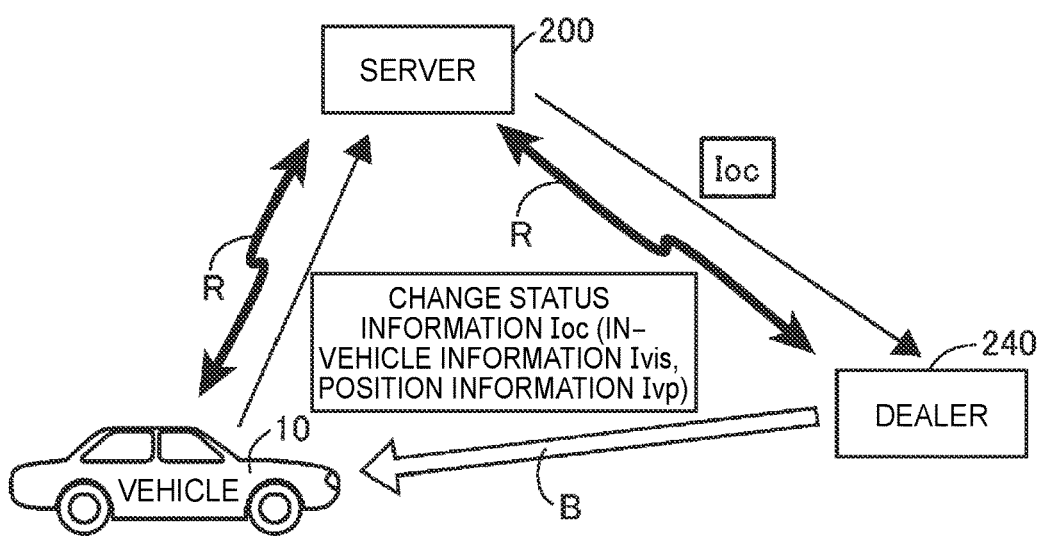
FIG. 10 illustrates an outline of how a dealer is notified of information regarding the change in control of the vehicle when the control of the vehicle is changed in association with an operation of updating the vehicle program.

FIG. 10 illustrates an outline of how the dealer 240 is notified of the information regarding the change in control of the vehicle 10 when the control of the vehicle 10 is changed in association with the operation of updating the vehicle program 91. In FIG. 10, like the vehicle 10, the dealer 240 is connected to the network 220 (see FIG. 4) via the wireless communication R and has a device that communicates with the server 200. When the control of the vehicle 10 is changed by switching the control mode from the normal control mode to the limp home mode in association with the operation of updating the vehicle program 91, the vehicle 10 sends change status information Ioc to the server 200 via the wireless communication R such as a mobile network. The change status information Ioc is the information about the fact that the control of the vehicle 10 has been changed in association with the update operation, namely the information on the status of the change in control of the vehicle 10. The change status information Ioc includes in-vehicle information Ivis, position information Ivp, etc. The in-vehicle information Ivis is information on the vehicle program 91 to be updated, the part of the vehicle program 91 that could not be updated successfully, the situation that caused the unsuccessful update of the vehicle program 91, and the control to which the control of the vehicle 10 has been changed. Based on the change status information Ioc, the server 200 selects the dealer 240 to receive the change status information Ioc. The server 200 then sends the change status information Ioc to the selected dealer 240. The dealer 240 selected by the server 200 is a dealer who usually do maintenance on the vehicle 10, a dealer located closest to the position of the vehicle 10 based on the position information Ivp, etc. The dealer 240 having received the change status information Ioc takes measures such as sending a professional to the vehicle 10 or sending a tow truck to move the vehicle 10, based on the change status information Ioc (see white arrow B in FIG. 10). The dealer 240 may contact the user of the vehicle 10 to inform the user of their specific way to handle the situation or instruct the user what to do (see white arrow B in FIG. 10).

As described above, when the limp home operation execution unit 98 switches the control of the vehicle 10 to the limp home control CT1p, the limp home operation execution unit 98 sends the information that the updated vehicle program 91r is not normal and the position information Ivp to the roadside assistance company for the vehicle 10.

For example, in the limp home mode, unsuccessful update of the vehicle program 91 may make the vehicle 10 less secure against theft. Accordingly, when the limp home operation execution unit 98 switches the control of the vehicle 10 to the limp home control CT1p, the limp home operation execution unit 98 may send the position information Ivp to the server 200. This improves security against theft during limp home mode.

Figure 11:
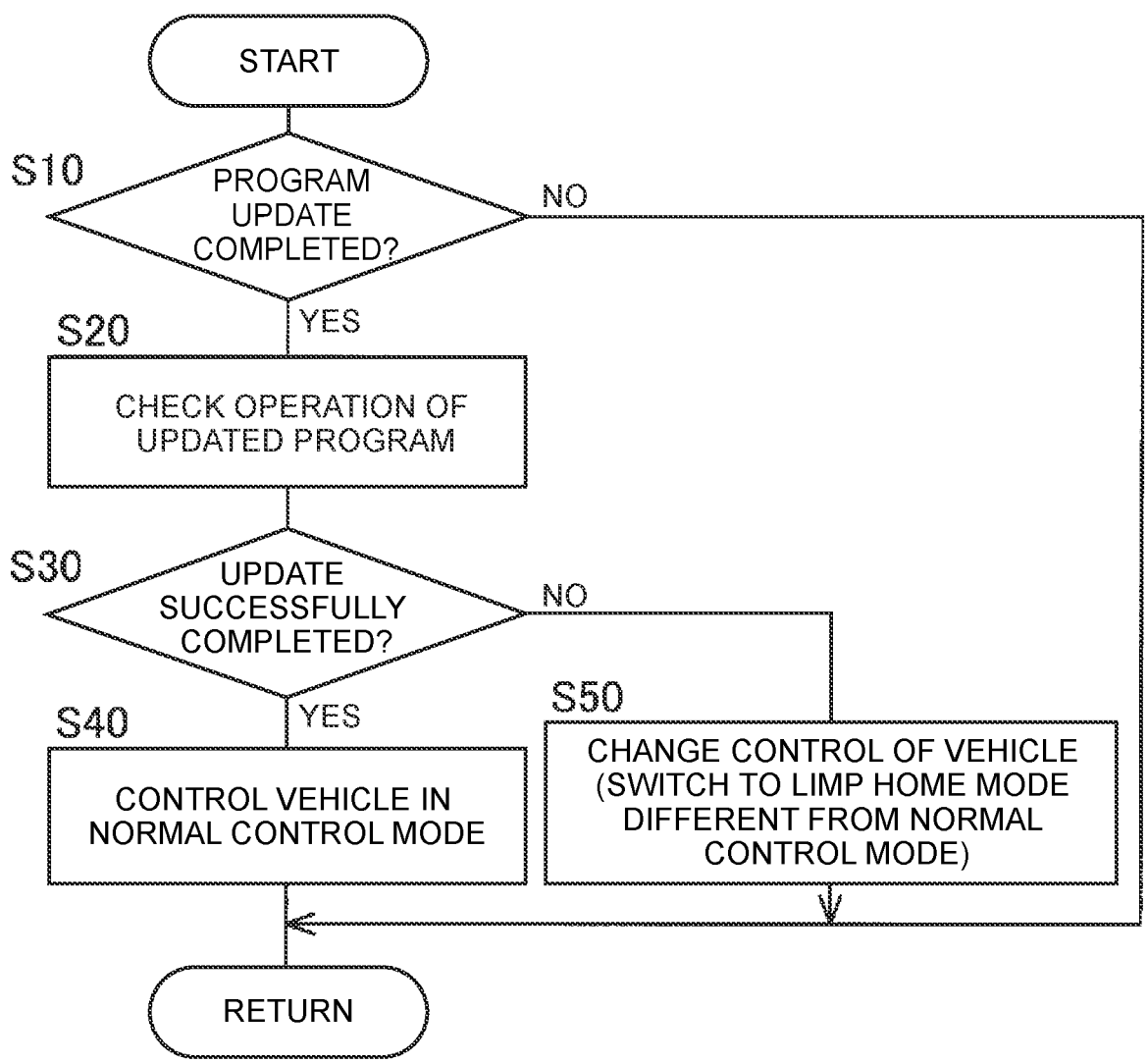
FIG. 11 is a flowchart of a main part of a control operation of an electronic control device, and illustrates a control operation for implementing the vehicle program update system capable of appropriately performing a limp home operation while curbing cost increases.

FIG. 11 is a flowchart of a main part of the control operation of the electronic control device 90, and illustrates the control operation for implementing the vehicle program update system 300 capable of appropriately performing the limp home operation while curbing cost increases. For example, this control operation is repeatedly performed.

Referring to FIG. 11, in step S10 (hereinafter the term "step" will be omitted) corresponding to the functions of the state determination unit 96, the electronic control device 90 first determines whether update of the vehicle program 91 to the update program 202 is completed. When determination result in S10 is No, the routine is finished. When determination result in S10 is Yes, the electronic control device 90 determines whether the updated vehicle program 91r is normal, namely checks the operation of the updated vehicle program 91r, in S20 corresponding to the functions of the successful update determination unit 97. Thereafter, in S30 corresponding to the functions of the successful update determination unit 97, the electronic control device 90 determines whether the update of the vehicle program 91 is completed successfully based on the check results obtained in S20. When determination result in S30 is Yes, the electronic control device 90 controls the vehicle 10 in the normal control mode in S40 corresponding to the functions of the AT shift control unit 92, the hybrid control unit 93, and the driving control unit 94. When determination result in S30 is No, the electronic control device 90 switches the control mode from the normal control mode to the limp home mode to change the control of the vehicle 10 in S50 corresponding to the functions of the limp home operation execution unit 98.

When determination result in S30 is No in the flowchart of FIG. 11, the electronic control device 90 may have the driver choose either "reinstall" or "switch to limp home mode" as shown in FIG. 9. When "reinstall" is selected, the electronic control device 90 updates the vehicle program 91 again, and the routine returns to S10. When "switch to limp home mode" is selected, the electronic control device 90 performs S50.

In the flowchart of FIG. 11, the electronic control device 90 may perform S50 when still determination result in S30 is No after reinstallation, which is the operation of updating the vehicle program 91 again because the determination result is No in S30 and returning the routine to S10, is performed a predetermined number of times.

When the electronic control device 90 performs S50 of the flowchart of FIG. 11, the electronic control device 90 may send the information that the updated vehicle program 91r is not normal and the position information Ivp to the roadside assistance company for the vehicle 10 (see FIG. 10). Alternatively, when the electronic control device 90 performs S50 of the flowchart of FIG. 11, the electronic control device 90 may send the position information Ivp to the server 200.

As described above, according to the present embodiment, when the update of the vehicle program 91 is completed and it is determined that the updated vehicle program 91r is not normal, the control of the vehicle 10 is switched from the normal control CTnm that is performed by the electronic control device 90 to the limp home control CT1p for performing the limp home operation in which the vehicle 10 travels using the driving force from the driving force sources (engine 14, second rotating machine MG2) without being controlled by the electronic control device 90. It is therefore guaranteed that the vehicle 10 travels with minimum functions even without being controlled by the electronic control device 90. In other words, the vehicle 10 can be safely driven without storing a limp home program in the electronic control device 90. Accordingly, the limp home operation is appropriately performed while curbing cost increases.

According to the present embodiment, the limp home operation is performed in which the power transmission device 12 is allowed to transmit the driving force from the driving force sources (engine 14, second rotating machine MG2) without being controlled by the electronic control device 90 using the AT program 91a. Accordingly, the limp home operation is appropriately performed.

According to the present embodiment, the limp home operation by the failsafe control CTfs is the vehicle 10 traveling with the predetermined limp home speed ratio attained in the power transmission device 12 due to no hydraulic control command signal Sat being output from the electronic control device 90. Accordingly, the limp home operation is appropriately performed.

According to the present embodiment, the predetermined limp home speed ratio is attained based on the energy obtained by the driving force from the engine 14. Accordingly, the limp home operation is appropriately performed.

According to the present embodiment, the control of the vehicle 10 is switched to the limp home control CT1p when the driver chooses to switch the control of the vehicle 10 to the limp home control CT1p out of the option to update the vehicle program 91 again and the option to switch the control of the vehicle 10 to the limp home control CT1p. This configuration meets the needs of the driver who wishes to drive with the normal control CTnm even if it takes time to update the vehicle program 91 again or the needs of the driver who wishes to perform the limp home operation quickly and have the update of the vehicle program 91 completed successfully by the roadside assistance company.

According to the present embodiment, the control of the vehicle 10 is switched to the limp home control CT1p when it is still determined that the updated vehicle program 91r is not normal after the operation of updating the vehicle program 91 again due to the updated vehicle program 91r being determined to be not normal is attempted a predetermined number of times. An update failure due to some external factor such as noise is therefore more likely to be avoided.

According to the present embodiment, the information that the updated vehicle program 91r is not normal and the position information Ivp are sent to the roadside assistance company for the vehicle 10 when the control of the vehicle 10 is switched to the limp home control CT1p. The roadside assistance company can thus smoothly handle the situation of the vehicle in which the limp home operation is being performed, which reduces inconvenience to the user of the vehicle 10.

According to the present embodiment, the virtual vehicle behavior Avv is calculated according to the command signal information Isc that is generated by the electronic control device 90 based on the virtual input information Ivin when the updated vehicle program 91r is used in the virtual space 310, and whether the updated vehicle program 91r is normal is determined based on whether the virtual vehicle behavior Avv matches the virtual input information Ivin. Accordingly, it can be confirmed that there is no problem with the updated vehicle program 91r even without actually operating the vehicle 10 using the updated vehicle program 91r.

Although the embodiment of the disclosure is described in detail above with reference to the drawings, the disclosure is also applicable in other forms.

For example, in the above embodiment, the electronic control device 90 includes the functions of the successful update determination unit 97, and the first gateway ECU 110 includes the functions of the program update unit 112. However, the disclosure is not limited to this form. For example, the first gateway ECU 110 may include all or a part of the functions of the successful update determination unit 97, and the electronic control device 90 may include all or a part of the functions of the program update unit 112. For example, the electronic control device 90 may include the first gateway ECU 110. Alternatively, as described above with reference to FIG. 6, the server 200 may include a part of the functions of the successful update determination unit 97. In other words, it is only necessary that the vehicle program update system 300 including the electronic control device 90, the first gateway ECU 110, the server 200, etc. include the functions of the successful update determination unit 97, the limp home operation execution unit 98, etc.

In the above embodiment, the network 220 and the wireless device 230 may be exclusively for the vehicle program update system 300 or may be versatile. The transmitter and receiver 100 and the server 200 are connected via the network 220. However, for example, the transmitter and receiver 100 and the server 200 may be connected via a wireless device included in the server 200 or may be connected via a wireless device directly connected to the server 200.

In the above embodiment, the electronic control device 90 and the server 200 check the operation of the updated vehicle program 91r in the virtual space 310 as shown in FIG. 6. However, only the electronic control device 90 may check the operation of the updated vehicle program 91r in the virtual space 310.

In the above embodiment, when the control of the vehicle 10 is switched to the limp home control CT1p, the change status information Ioc is sent to the dealer 240 selected by the server 200 via the server 200, as shown in FIG. 10. However, the disclosure is not limited to this form. For example, the change status information Ioc may be sent to the dealer 240 selected by the vehicle 10 without via the server 200. Alternatively, the server 200 may not select the dealer 240 but merely send the change status information Ioc received from the vehicle 10 to the dealer 240 selected by the vehicle 10.

In the above embodiment, in S30 of the flowchart of FIG. 11, whether it is necessary to change the control of the vehicle 10 may be determined based on the check results obtained in S20. Specifically, when the check results obtained in S20 indicate that the updated vehicle program 91r is normal, it is determined in S30 that the update of the vehicle program 91 is completed successfully and that it is not necessary to change the control of the vehicle 10, and S40 is performed. When the check results obtained in S20 indicate that the updated vehicle program 91r is not normal, it is determined in S30 that the update of the vehicle program 91 is not completed successfully and that it is necessary to change the control of the vehicle 10, and S50 is performed.

In the above embodiment, the AT program 91a is shown as the vehicle program 91 that is used to determine whether to switch to the limp home control CT1p based on whether the updated vehicle program 91r is normal. However, the disclosure is not limited to this form. For example, the disclosure is also applicable when the vehicle program 91 that is used to determine whether to switch to the limp home control CT1p is a wheel brake program that is used to control the wheel brake device 86. In other words, the disclosure is applicable as long as the vehicle program 91 that is used to determine whether to switch to the limp home control CT1p is any vehicle program other than the ENG program and the MG program that are used to control the driving force sources (engine 14, second rotating machine MG2). For example, from the standpoint that the vehicle 10 need only be able to travel in the EV mode during the limp home control CT1p, the disclosure is applicable as long as the vehicle program 91 that is used to determine whether to switch to the limp home control CT1p is any vehicle program other than the MG program. That is, the disclosure is applicable as long as the vehicle program 91 that is used to determine whether to switch to the limp home control CT1p is any vehicle program other than the driving force source programs that are used to control the driving force sources that generate the driving force to be used for the limp home operation.

In the above embodiment, the vehicle 10 including the compound transmission 40 is shown as the vehicle to which the disclosure is applied. However, the vehicle to which the disclosure is applied is not limited to the vehicle 10. The disclosure is applicable to any vehicle that updates a vehicle program to an update program received from an external device separate from the vehicle via wireless communication.

The above embodiment is merely illustrative, and the disclosure can be carried out in various modified or improved forms based on the knowledge of those skilled in the art.

What is claimed is:

1. A vehicle program update system that updates a vehicle program that is used to control a vehicle by an on-board control device mounted on the vehicle, the vehicle program update system comprising:
    a processor that is configured to:
        determine whether an updated vehicle program is normal when an update of the vehicle program is completed;

execute a notification to a driver to choose one of an option to update the vehicle program again and an option to switch the control of the vehicle to a limp home control when determination is made that the updated vehicle program is not normal; and when determination is made that the updated vehicle program is not normal and the driver chooses to switch the control of the vehicle to the limp home control, switch control of the vehicle from control that is performed by the on-board control device using the vehicle program to the limp home control for performing a limp home operation in which the vehicle travels using a driving force from a vehicle driving force source without being controlled by the on-board control device.

2. The vehicle program update system according to claim 1, wherein:
the vehicle program is a power transmission device program that is used to control a power transmission device that transmits the driving force from the vehicle driving force source; and
the processor is configured to perform the limp home operation in which the power transmission device is allowed to transmit the driving force without being controlled by the on-board control device.

3. The vehicle program update system according to claim 2, wherein the limp home operation is the vehicle traveling with a predetermined limp home speed ratio attained in the power transmission device due to no command signal being output from the on-board control device.

4. The vehicle program update system according to claim 3, wherein the predetermined limp home speed ratio is calculated based on energy obtained by the driving force from the vehicle driving force source.

5. The vehicle program update system according to claim 1, wherein the processor is configured to switch the control of the vehicle to the limp home control when determination is still made that the updated vehicle program is not normal after an operation of updating the vehicle program again due to the updated vehicle program being determined to be not normal is attempted a predetermined number of times.

6. The vehicle program update system according to claim 1, wherein the processor is configured to send information that the updated vehicle program is not normal and information on a current position of the vehicle to a roadside assistance company for the vehicle when the control of the vehicle is switched to the limp home control.

7. A vehicle program update method for updating a vehicle program that is used to control a vehicle by an on-board control device mounted on the vehicle, the vehicle program update method comprising:
determining whether an updated vehicle program is normal when the update of the vehicle program is completed;
executing a notification to a driver to choose one of an option to update the vehicle program again and an option to switch the control of the vehicle to a limp home control when determination is made that the updated vehicle program is not normal; and
switching control of the vehicle from control that is performed by the on-board control device using the vehicle program to the limp home control for performing a limp home operation in which the vehicle travels using a driving force from a vehicle driving force source without being controlled by the on-board control device, when determination is made that the updated vehicle program is not normal and the driver chooses to switch the control of the vehicle to the limp home control.

* * * * *